United States Patent
Smiley

(10) Patent No.: US 8,892,102 B2
(45) Date of Patent: Nov. 18, 2014

(54) SYSTEMS AND METHODS FOR CONTROLLING A FREQUENCY BAND OF OPERATION OF A BASE STATION

(75) Inventor: Russell Clifford Smiley, Richmond (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 105 days.

(21) Appl. No.: 13/561,348

(22) Filed: Jul. 30, 2012

(65) Prior Publication Data
US 2014/0031042 A1 Jan. 30, 2014

(51) Int. Cl.
*H04W 36/00* (2009.01)
*H04W 72/04* (2009.01)
*H04W 24/02* (2009.01)

(52) U.S. Cl.
CPC .......... *H04W 72/0453* (2013.01); *H04W 24/02* (2013.01)
USPC ..... 455/438; 455/450; 455/452.1; 455/452.2; 455/552.1; 370/331; 370/338; 370/352; 370/401

(58) Field of Classification Search
CPC ......... H04Q 7/20; H04W 72/00; H04W 36/00
USPC ................ 455/62, 422.1, 423, 424, 454, 455, 455/552.1, 553.1, 436–444, 450–453; 370/329, 331–338, 352–356, 401
See application file for complete search history.

(56) References Cited

U.S. PATENT DOCUMENTS

| | | | | |
|---|---|---|---|---|
| 5,940,761 A * | 8/1999 | Tiedemann et al. | ........... | 455/437 |
| 6,047,188 A * | 4/2000 | Noda et al. | ..................... | 455/450 |
| 6,141,565 A * | 10/2000 | Feuerstein et al. | ............ | 455/560 |
| 6,928,267 B2 * | 8/2005 | Melero | ...................... | 455/67.11 |
| 7,224,977 B2 * | 5/2007 | Cavalli et al. | .............. | 455/452.1 |
| 7,610,057 B2 * | 10/2009 | Bahl et al. | ...................... | 455/522 |
| 7,747,256 B2 * | 6/2010 | Hanov et al. | ............... | 455/452.2 |
| 7,835,694 B2 * | 11/2010 | Shiff | ............................ | 455/13.1 |
| 8,185,124 B2 * | 5/2012 | Antic et al. | ................ | 455/452.1 |
| 8,374,619 B2 * | 2/2013 | Jones et al. | .................... | 455/450 |
| 8,498,322 B2 * | 7/2013 | Smiley | .......................... | 375/146 |
| 2003/0078050 A1 * | 4/2003 | Carlborg et al. | ............. | 455/452 |
| 2011/0189997 A1 * | 8/2011 | Tiwari et al. | ................. | 455/443 |

OTHER PUBLICATIONS

Unknown, "3 GPP Specification Detail," 3GPP TS 36.104, 2 pages, accessed Oct. 4, 2012, www.3gpp.org/ftp/Specs/html-info/36104.htm.

* cited by examiner

*Primary Examiner* — Sharad Rampuria
(74) *Attorney, Agent, or Firm* — Withrow & Terranova, PLLC

(57) ABSTRACT

The present disclosure relates to controlling a frequency band of operation of one or more base stations in a cellular communication network based on associated parameters of air interfaces of the one or more base stations. In one embodiment, a control element of the cellular communication network obtains parameters for an air interface of a base station. In addition, in some embodiments, the control element obtains one or more parameters for air interfaces of one or more additional base stations. Using the one or more parameters, the control element obtains a decision to switch a frequency band of operation of the base station from a first frequency band to a second frequency band. In response, the control element sends a command to the base station to switch the frequency band of operation of the base station from the first frequency band to the second frequency band.

12 Claims, 24 Drawing Sheets

SYSTEMS AND METHODS FOR CONTROLLING A FREQUENCY BAND OF OPERATION OF A BASE STATION

FIELD OF THE DISCLOSURE

The present disclosure relates to controlling a frequency band of operation of one or more base stations in a cellular communication network.

BACKGROUND

In a cellular communication network, base stations coordinate an interface between a larger communication network and one or more wireless devices. Wireless communication between the wireless devices and the base stations occur in a specific frequency band of operation allocated to the cellular communication network. For instance, wireless communication for the Long Term Evolution (LTE) standard may be in the 700 megahertz (MHz) frequency band or the 2100 MHz frequency band in North America for at least some service providers (e.g., AT&T Mobile). The specific frequency band of operation may depend on the wireless communication standard, service provider, and/or geographic area.

However, the use of static frequency bands of operation has at least two issues. First, the static nature of the frequency band of operation limits the potential for increased efficiencies in the cellular communication network. Second, the static nature of the frequency band of operation limits the tools available for dealing with failures or other issues (e.g., congestion, interference, etc.) on the static frequency band of operation. As such, there is a need for systems and methods for controlling a frequency band of operation of base stations in a cellular communication network.

SUMMARY

The present disclosure relates to controlling a frequency band of operation of one or more base stations in a cellular communication network based on associated parameters of air interfaces of the one or more base stations. In one embodiment, a control element of the cellular communication network obtains parameters for an air interface of a base station. In addition, in some embodiments, the control element obtains one or more parameters for air interfaces of one or more additional base stations. Using the one or more parameters, the control element obtains a decision to switch a frequency band of operation of the base station from a first frequency band to a second frequency band. In response, the control element sends a command to the base station to switch the frequency band of operation of the base station from the first frequency band to the second frequency band. Optionally, the control element may also send information indicative of an air interface emissions specification for the second frequency band to the base station.

In one embodiment, the control element is a network controller that programmatically makes the decision to switch the frequency band of operation of the base station from the first frequency band to the second frequency band and then sends the command to the base station. In another embodiment, the control element is a command center that presents information indicative of the one or more parameters to a human operator and receives the decision to switch the frequency band of operation of the base station from the first frequency band to the second frequency band from the human operator. The command center then sends the command to the base station.

In another embodiment, a network controller obtains parameters for an air interface of a base station. In addition, in some embodiments, the network controller obtains one or more parameters for air interfaces of one or more additional base stations. The network controller determines whether a decision regarding a frequency band of operation of the base station can be made programmatically by the network controller. If so, the network controller programmatically makes a decision to switch the frequency band of operation of the base station from a first frequency band to a second frequency band based on the one or more parameters for the air interface of the base station and sends a corresponding command to the base station. Otherwise, the network controller sends the one or more parameters for the air interface of the base station to a command center where information indicative of these parameters is presented to a human operator. The network controller then receives a decision to switch the frequency band of operation of the base station from the first frequency band to the second frequency band based on corresponding input from the human operator at the command center and then sends a corresponding command to the base station.

In another embodiment, a base station determines one or more parameters for an air interface of the base station. In addition, in some embodiments, the base station obtains parameters for air interfaces of one or more additional base stations. Based on the one or more parameters, the base station programmatically makes a decision to switch a frequency band of operation of the base station from a first frequency band to a second frequency band. The base station then switches a frequency band of operation of one or more radio units of the base station from the first frequency band to the second frequency band. In some embodiments, the base station obtains information indicative of an air interface emissions specification for the second frequency band from the control element.

The systems and methods disclosed also relate to a base station of a cellular communication network that receives a command to switch a frequency band of operation of the base station. In one embodiment, the base station receives a command from a control element to switch the frequency band of operation of the base station from a first frequency band to a second frequency band. In response, the base station configures one or more radio units of the base station to switch from the first frequency band to the second frequency band. In addition, in some embodiments, the base station configures the one or more radio units to conform to an air interface emissions specification for the second frequency band. In one embodiment, the base station receives information indicative of the air interface emissions specification from the control element. In another embodiment, information indicative of the air interface emissions specification for the second frequency band is preprogrammed on or stored locally at the base station.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
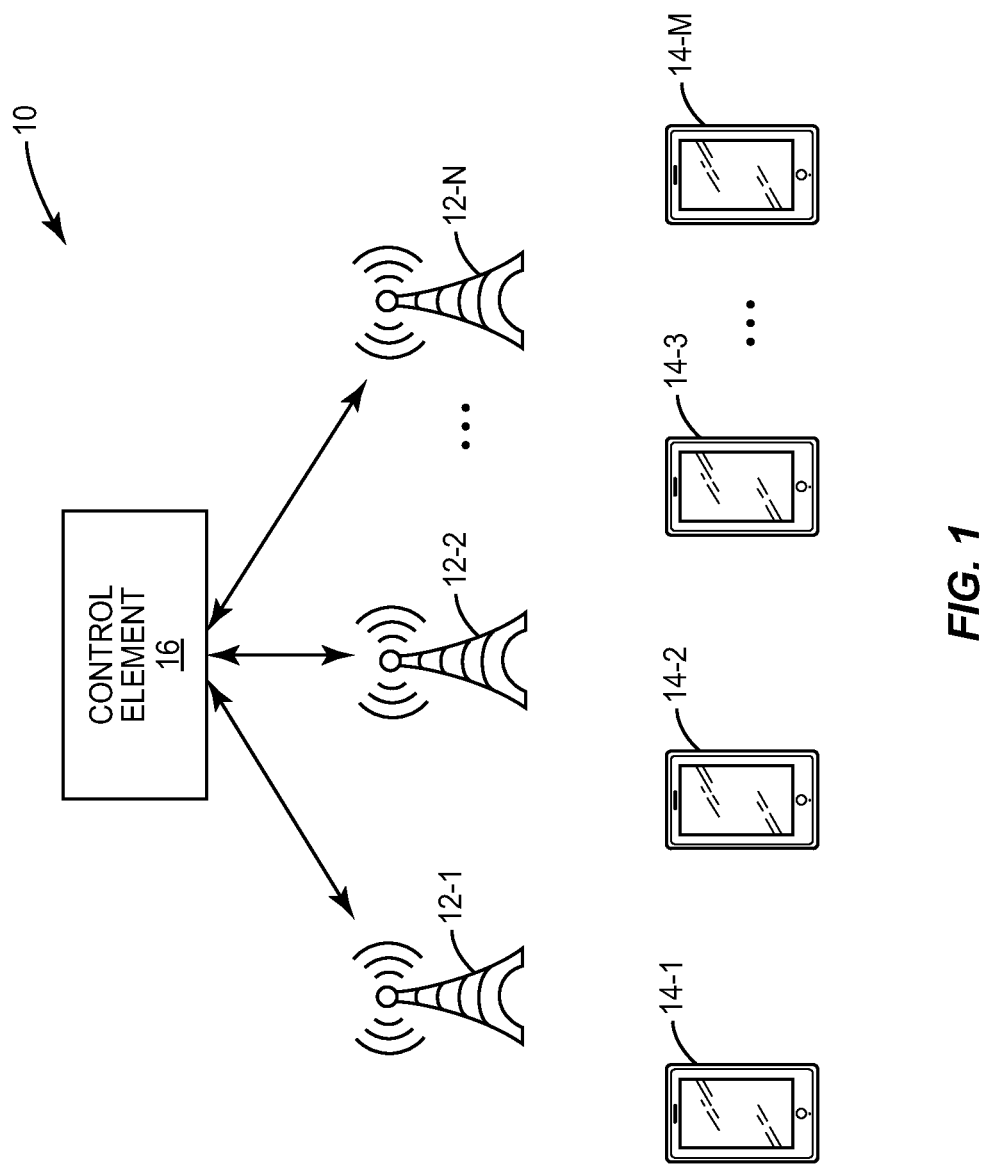
FIG. 1 illustrates a cellular communication network in which a frequency band of operation of one or more base stations is controlled based on parameters of air interfaces of the one or more base stations according to one embodiment of the present disclosure.
Figure 4:
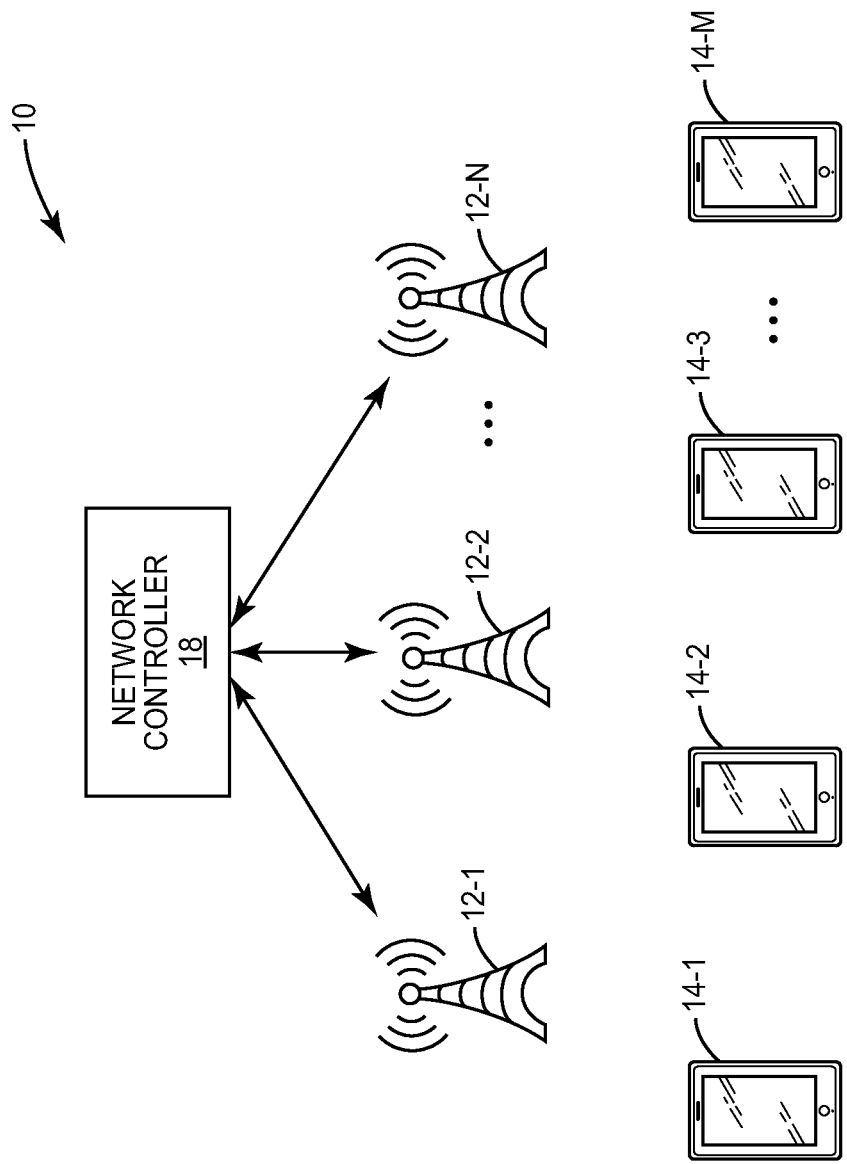
FIG. 4 illustrates an embodiment of the cellular communication network of FIG. 1 in which the control element is a network controller that programmatically controls a frequency band of operation of one or more base stations based on parameters of air interfaces of the one or more base stations according to one embodiment of the present disclosure.
Figure 6:
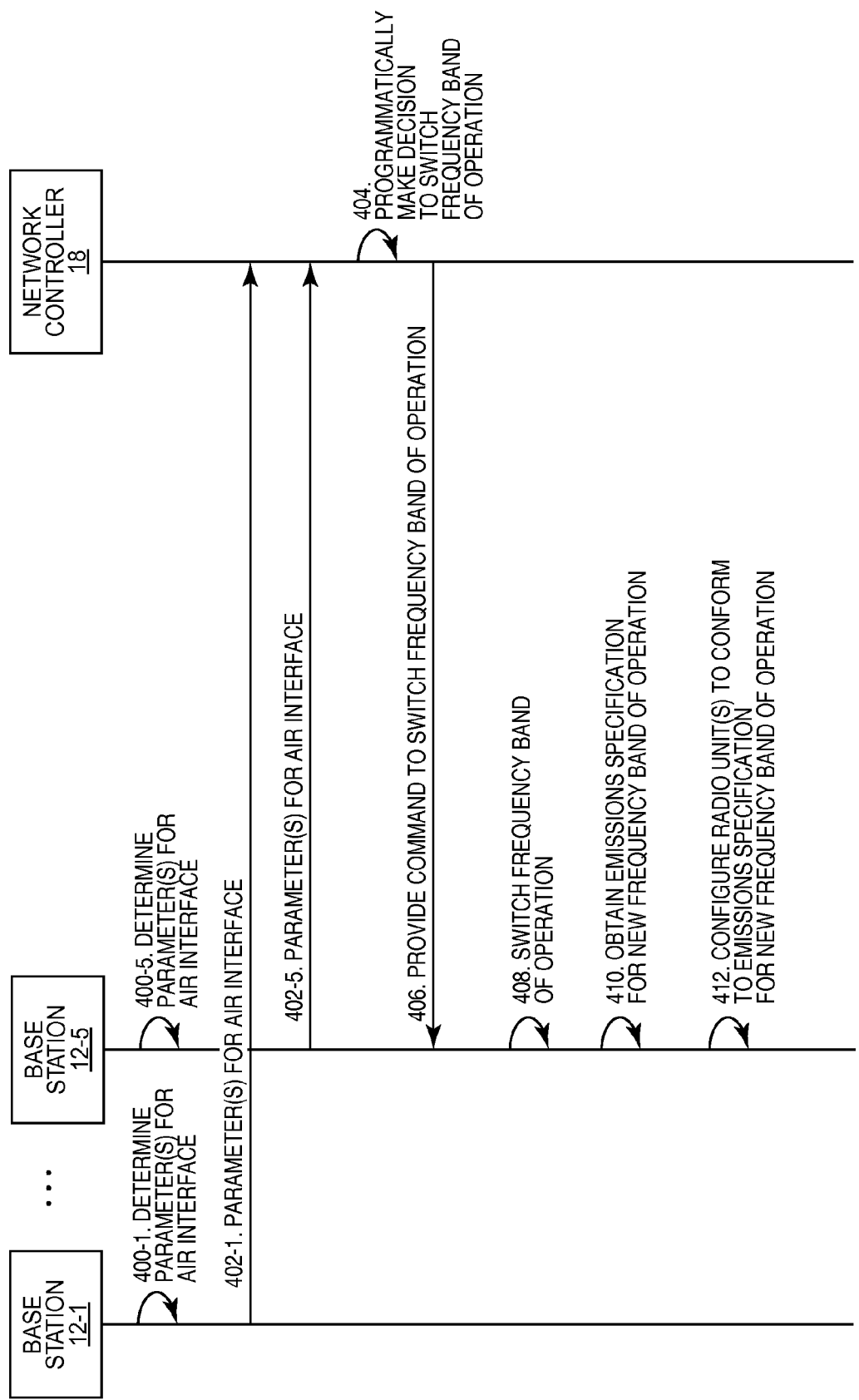
Figure 7:
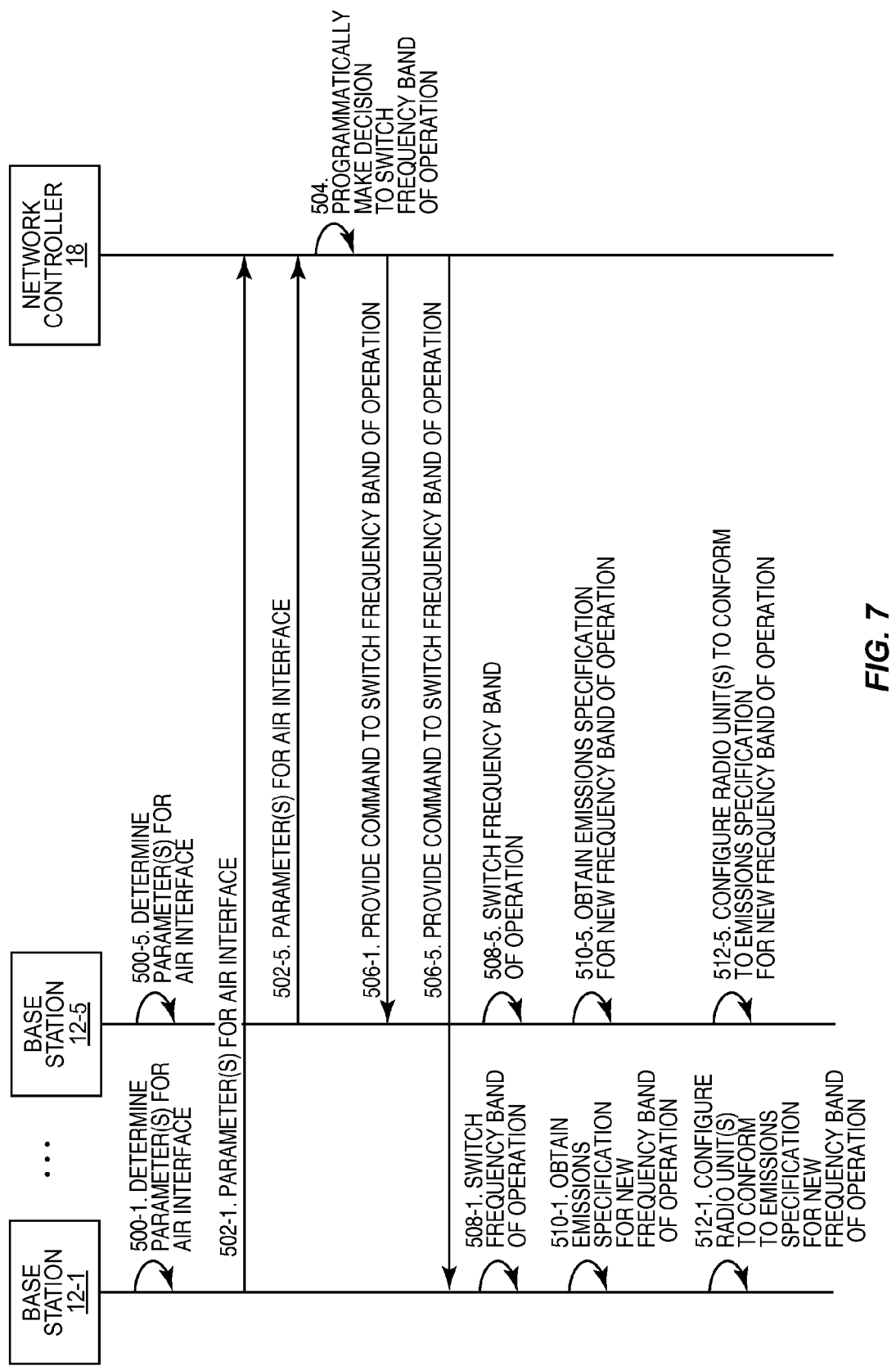
Figure 8:
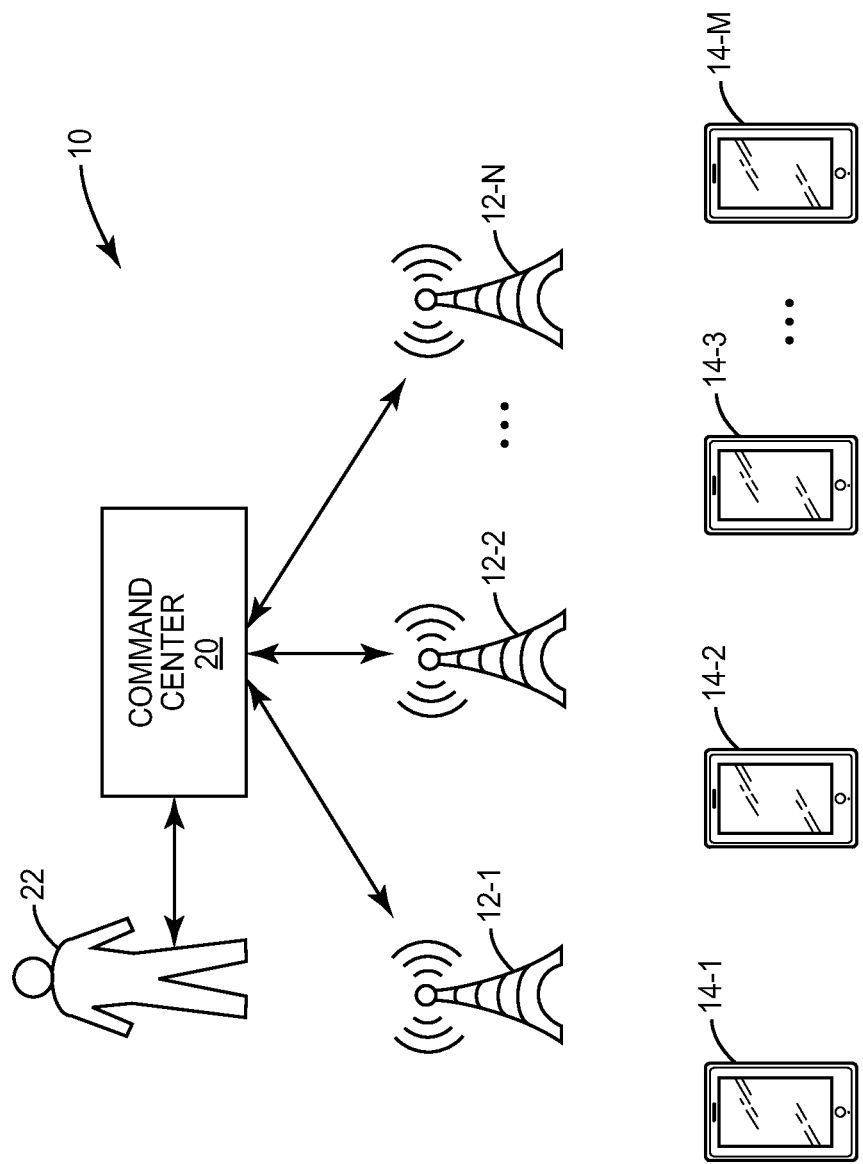
Figure 9:
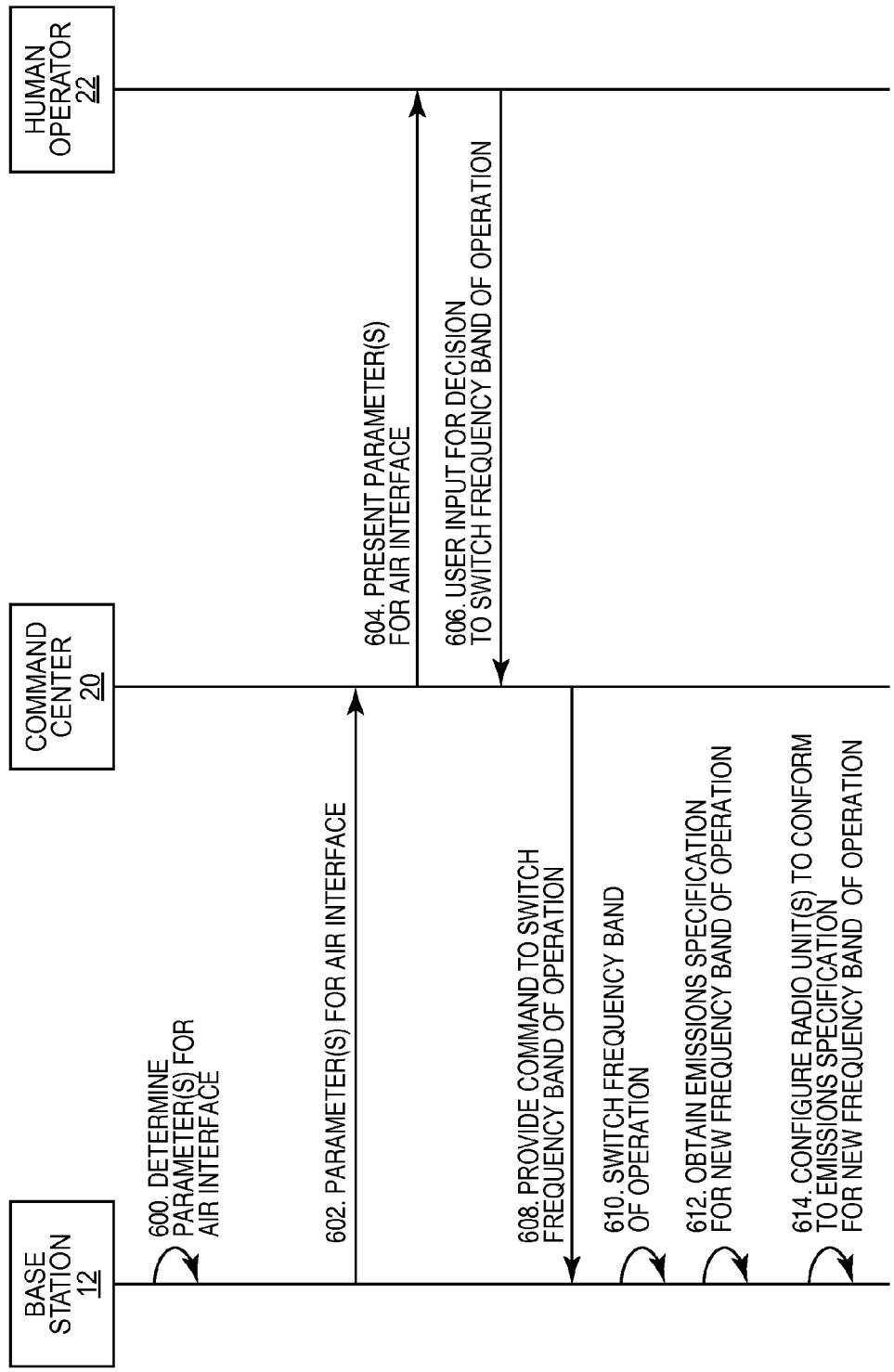
Figure 10:
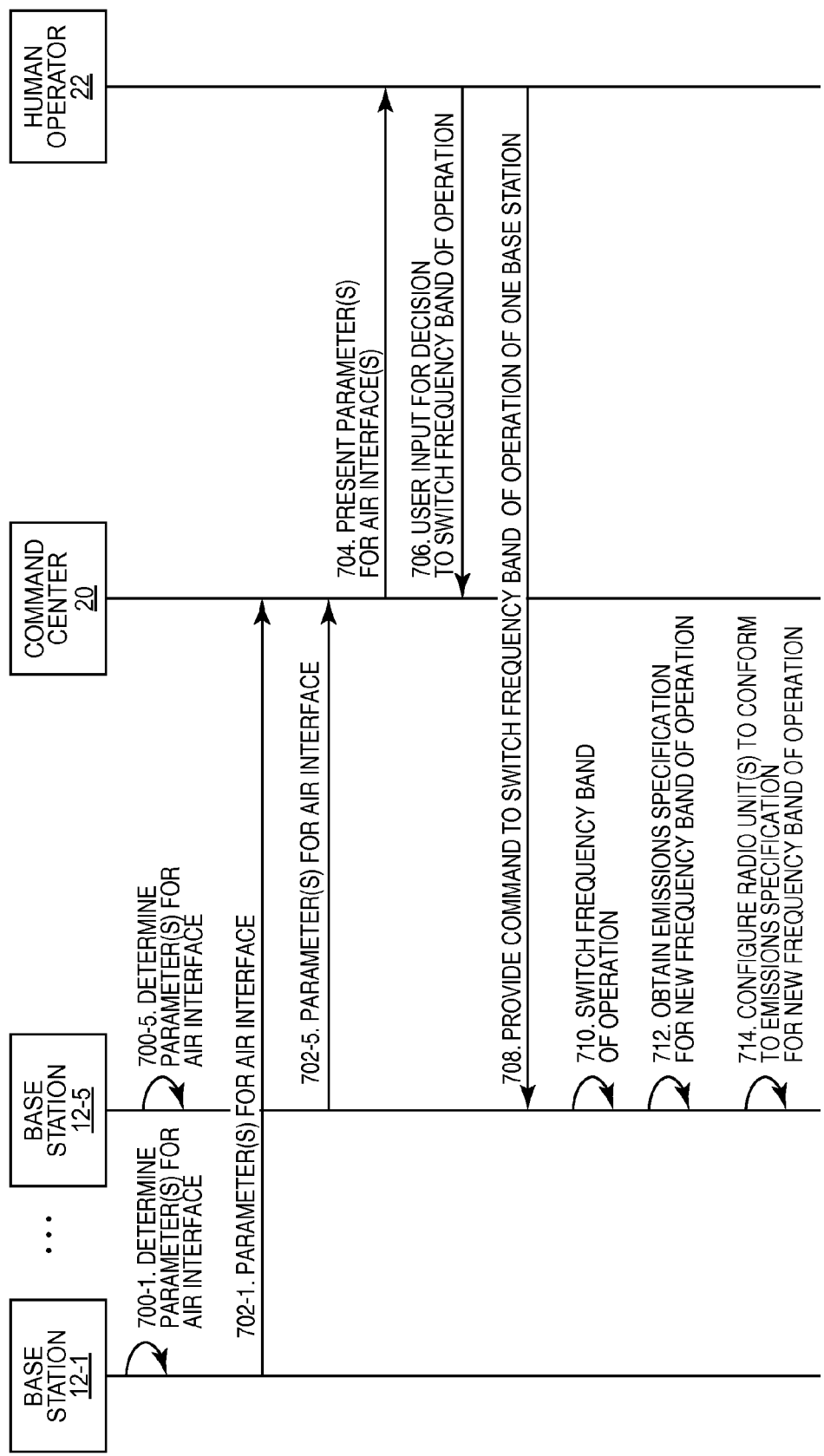
Figure 11:
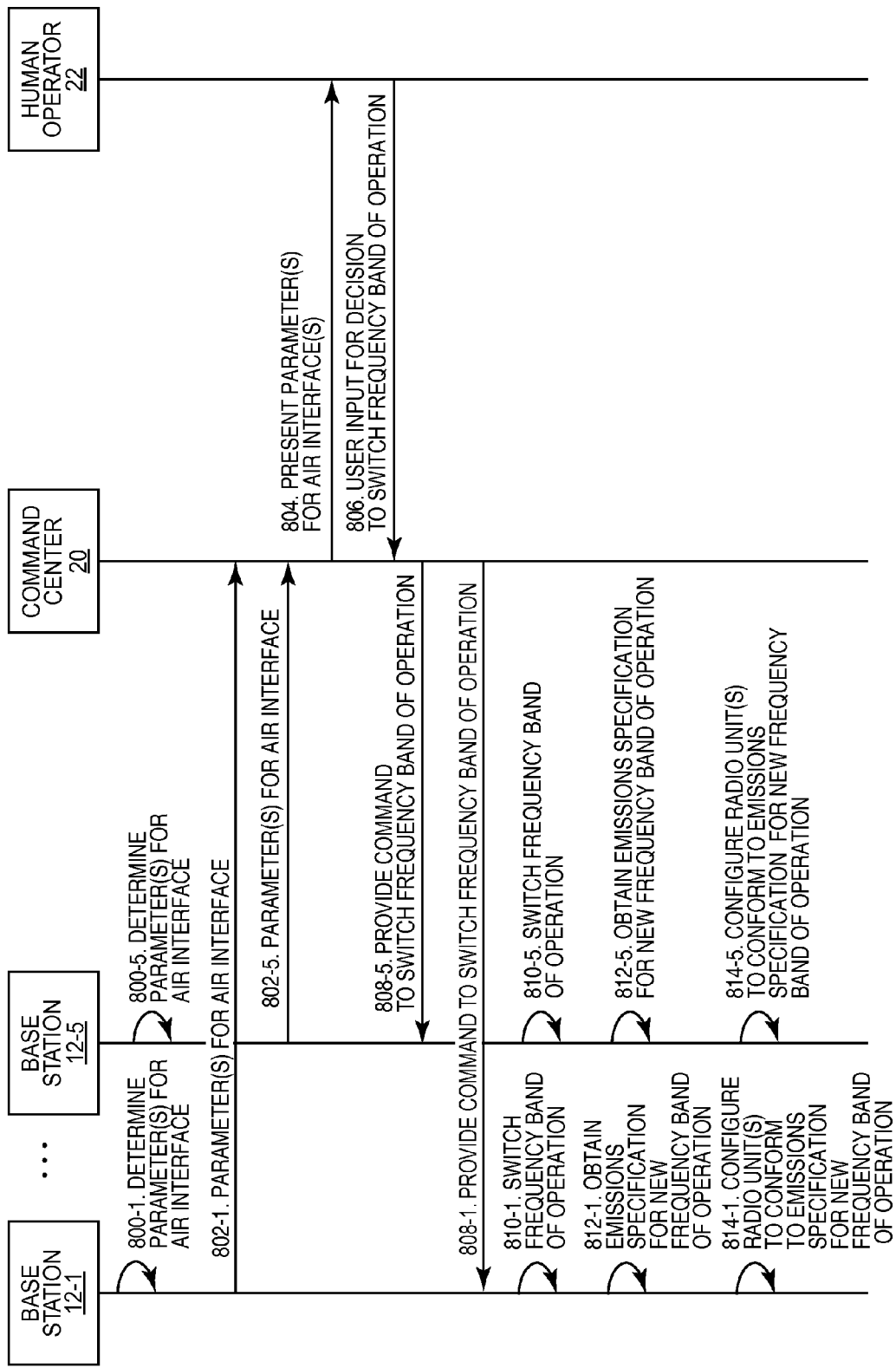
Figure 12:
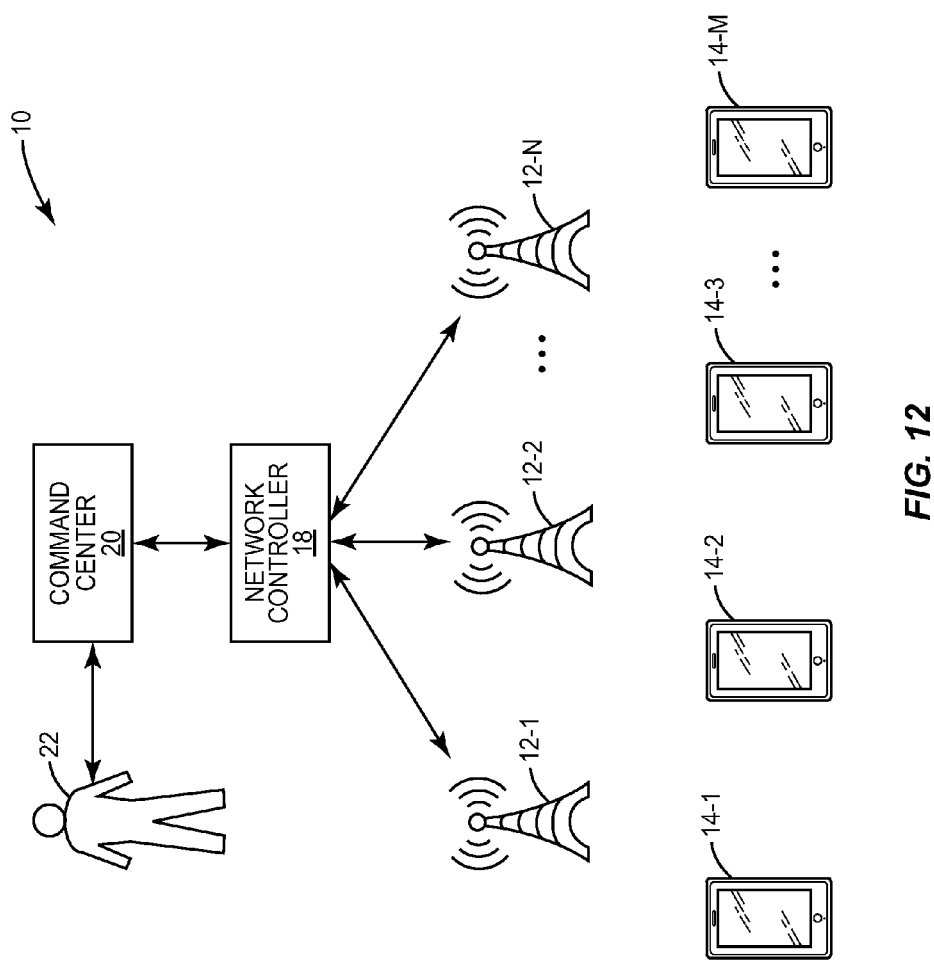
Figure 13:
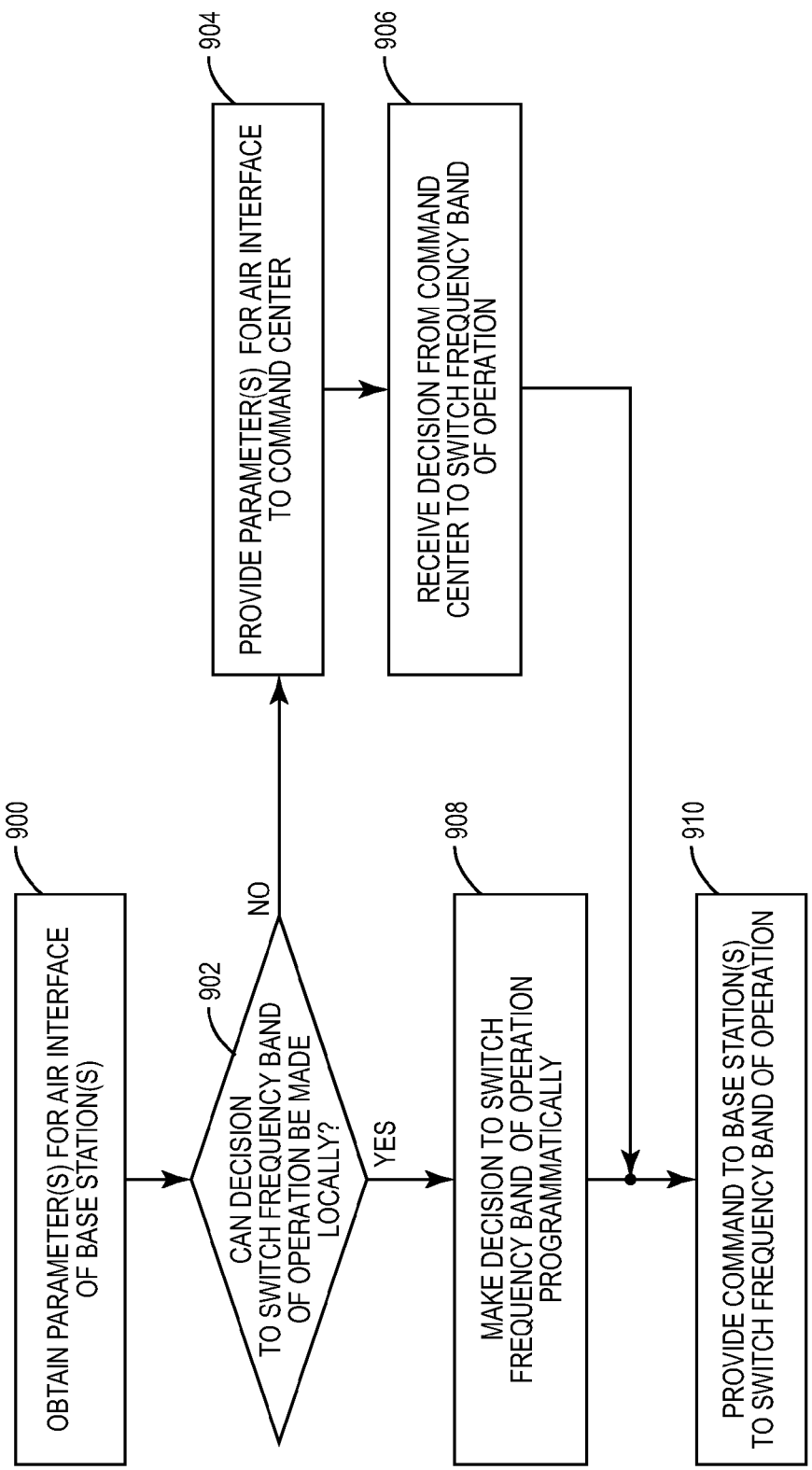
Figure 14A:
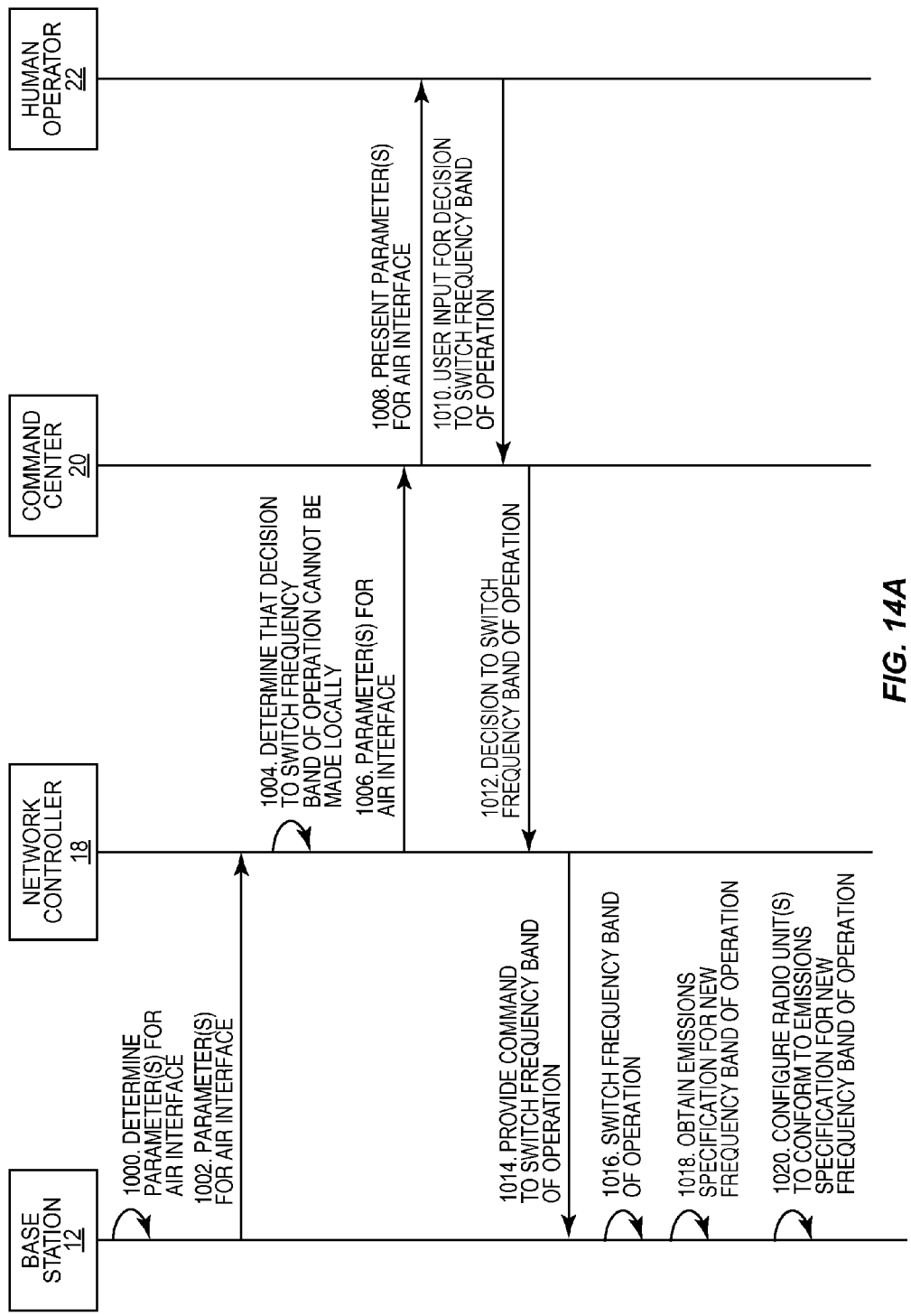
Figure 14B:
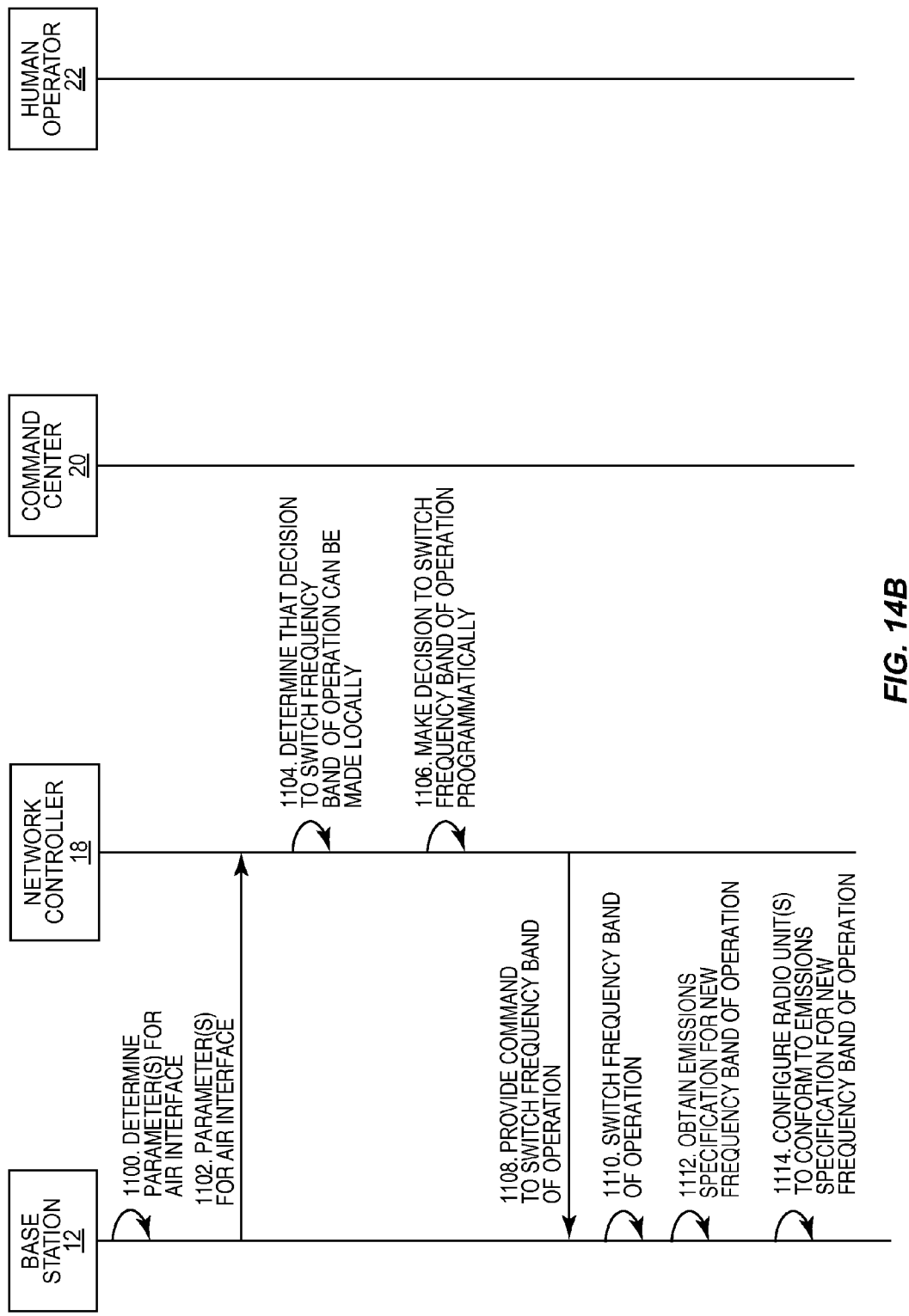
Figure 15A:
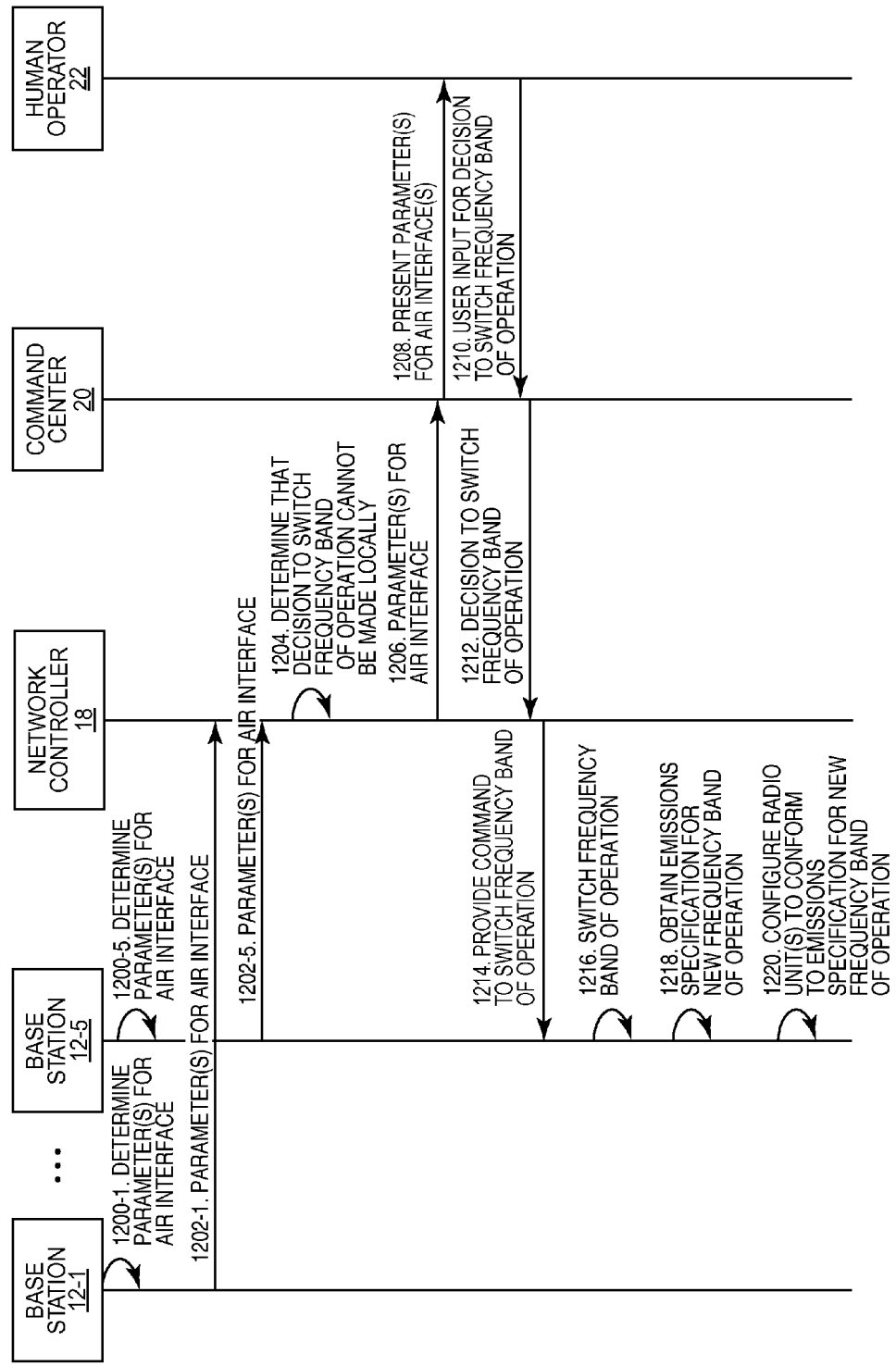
Figure 15B:
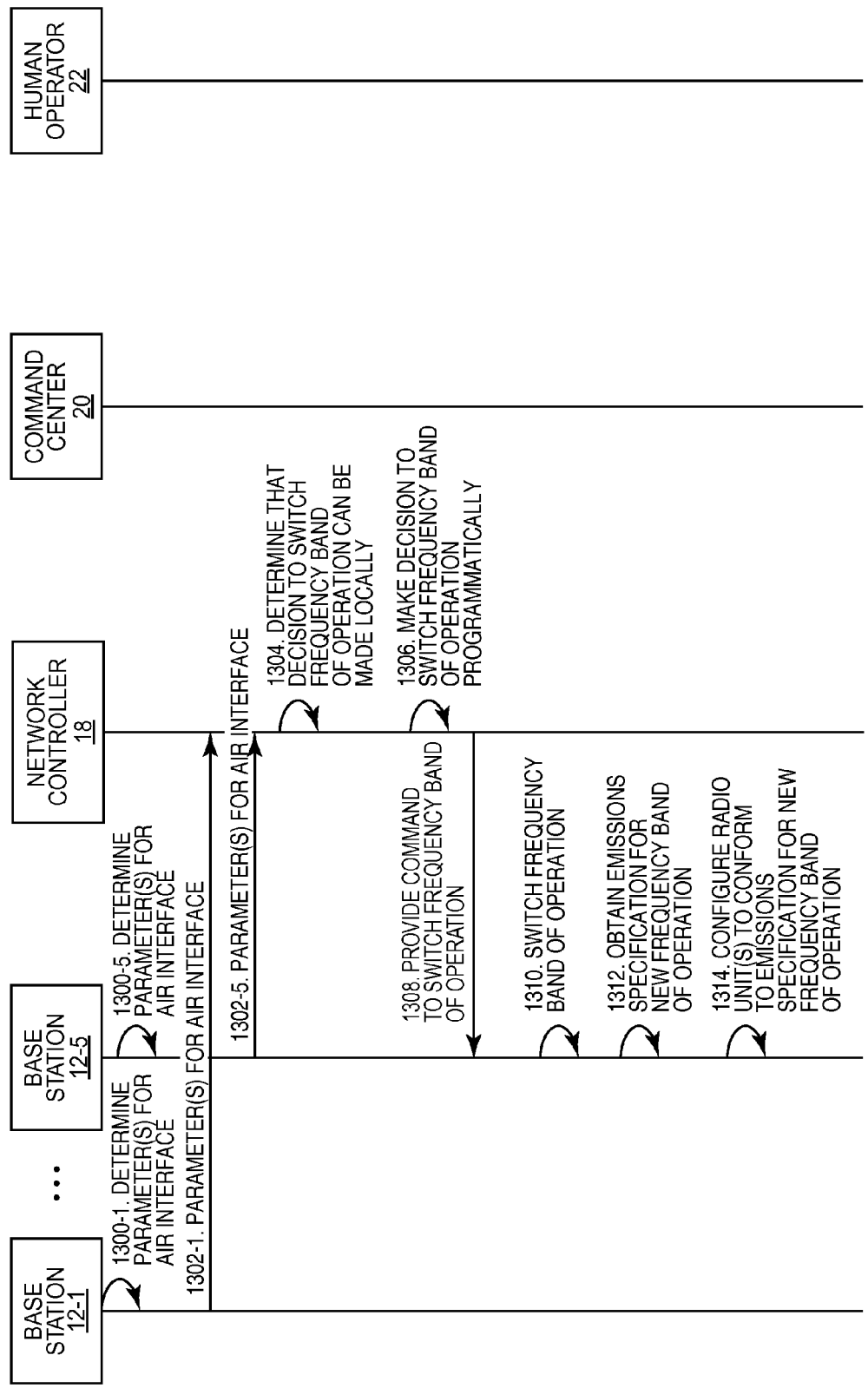
Figure 16A:
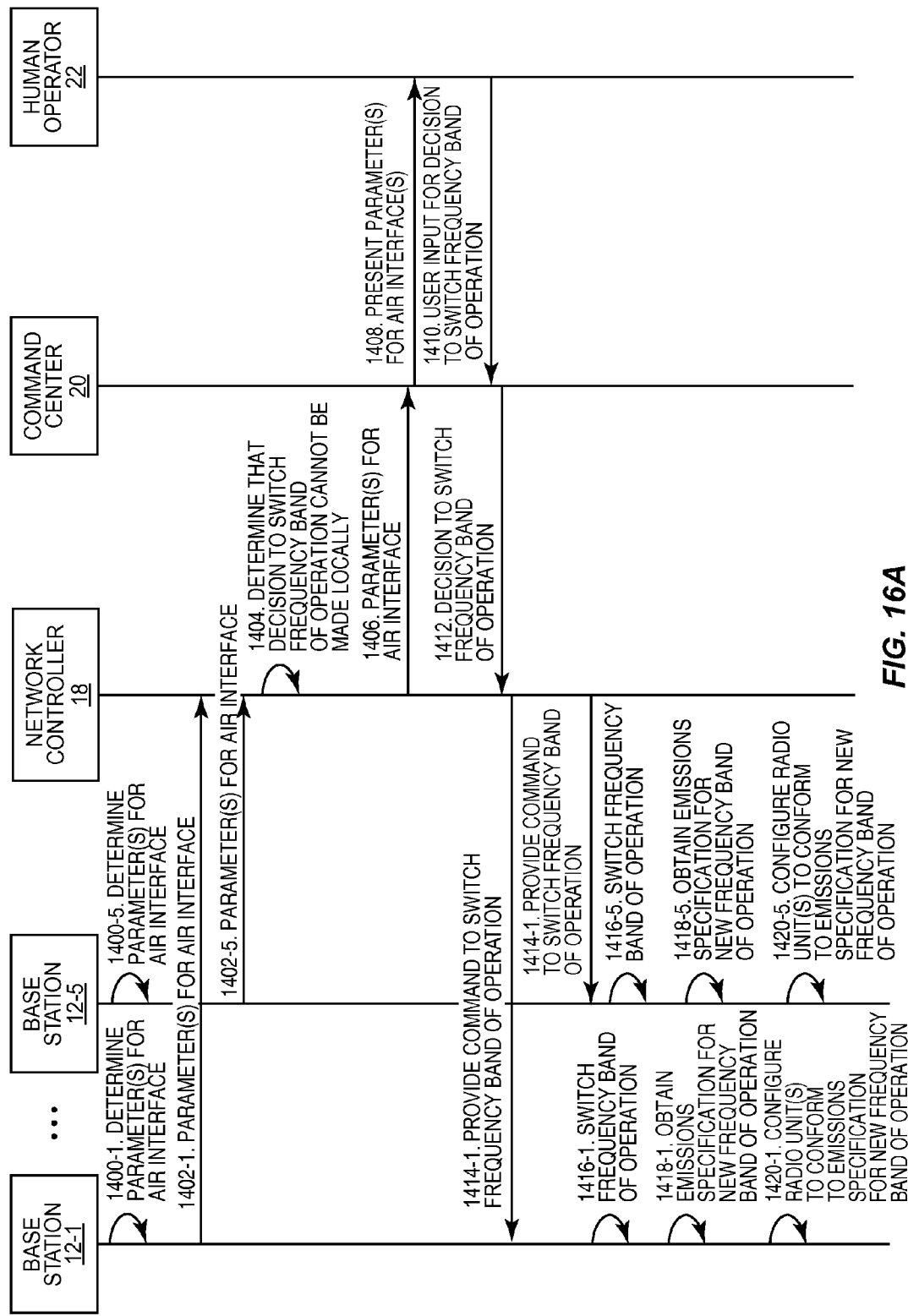
Figure 16B:
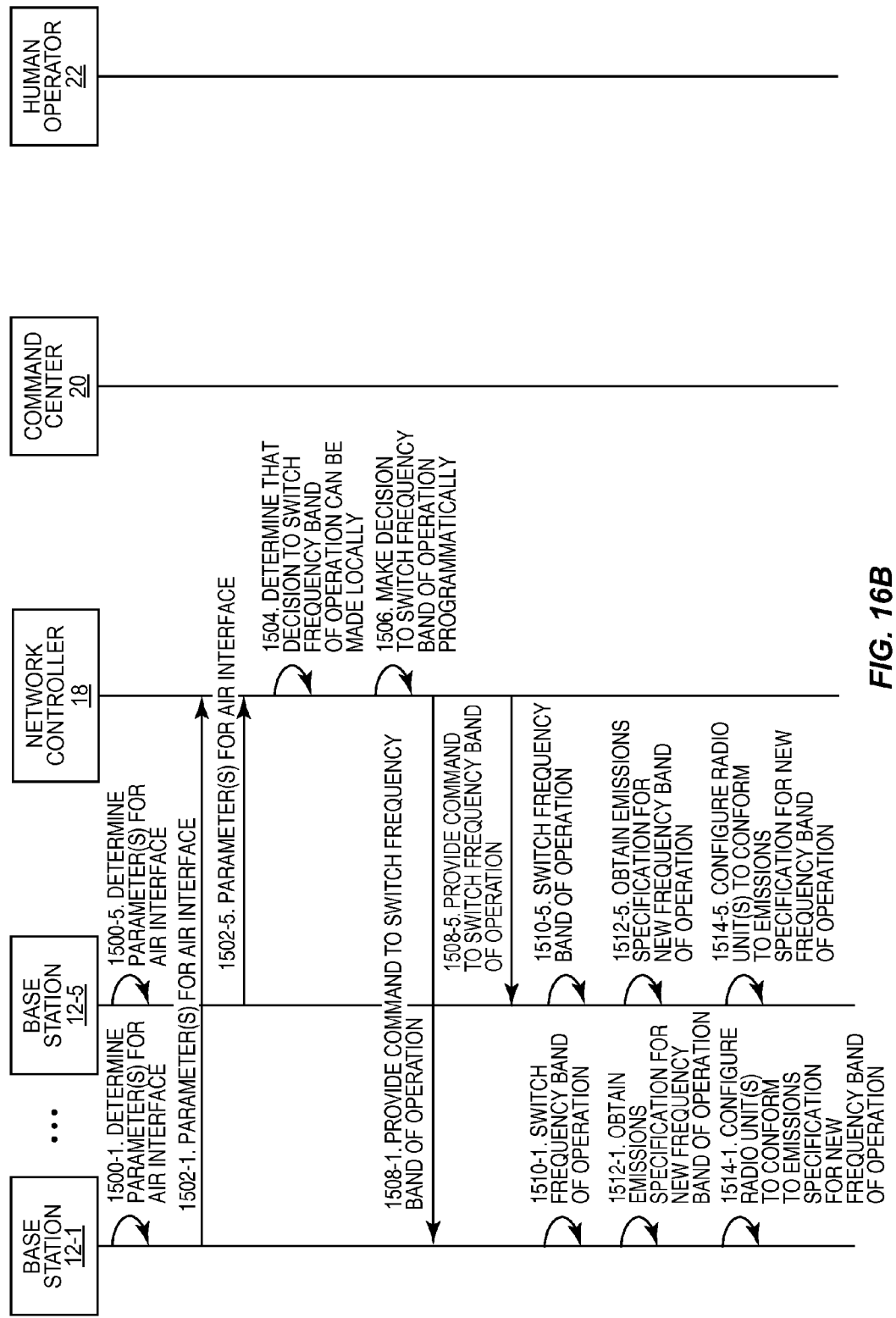
Figure 17:
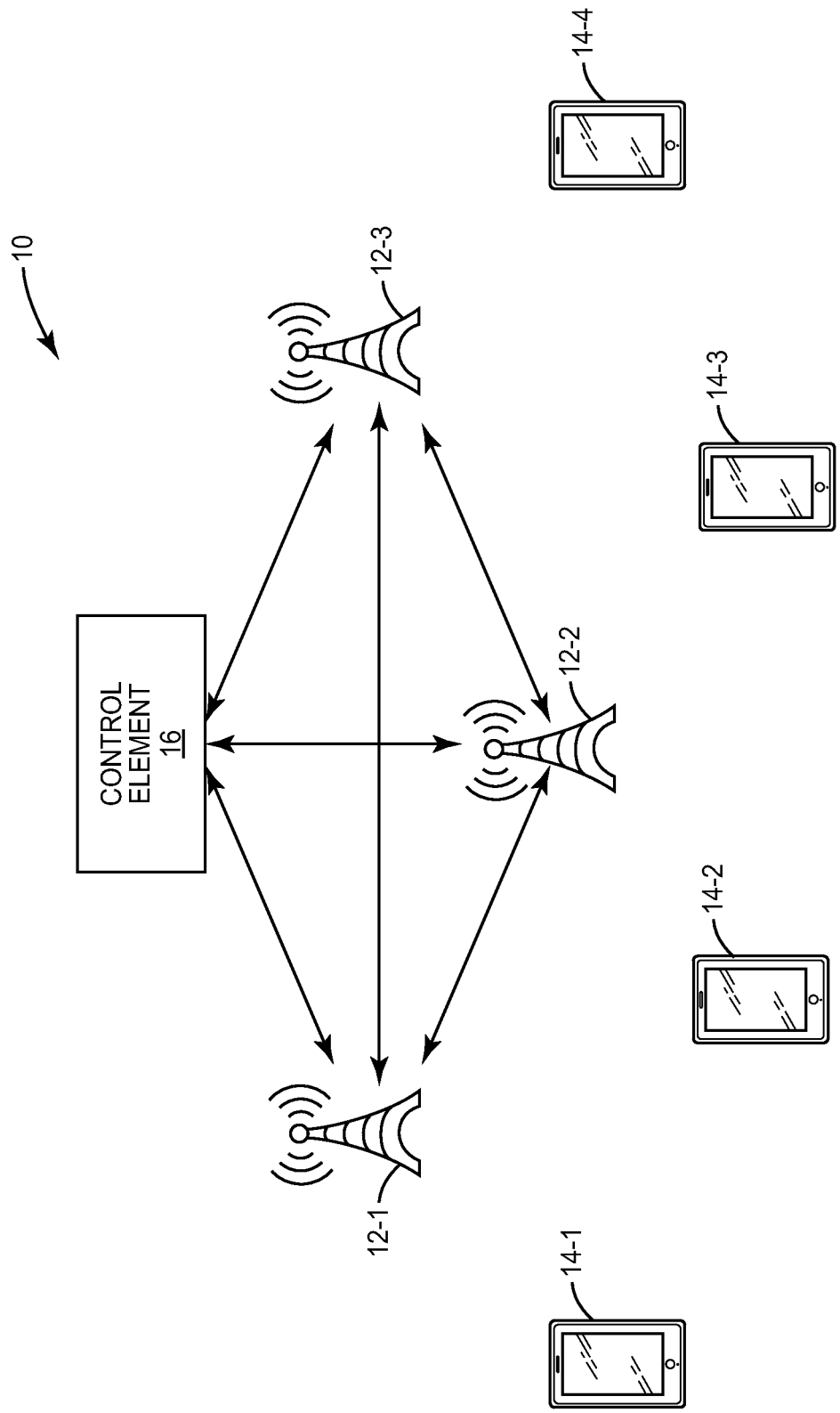
Figure 18:
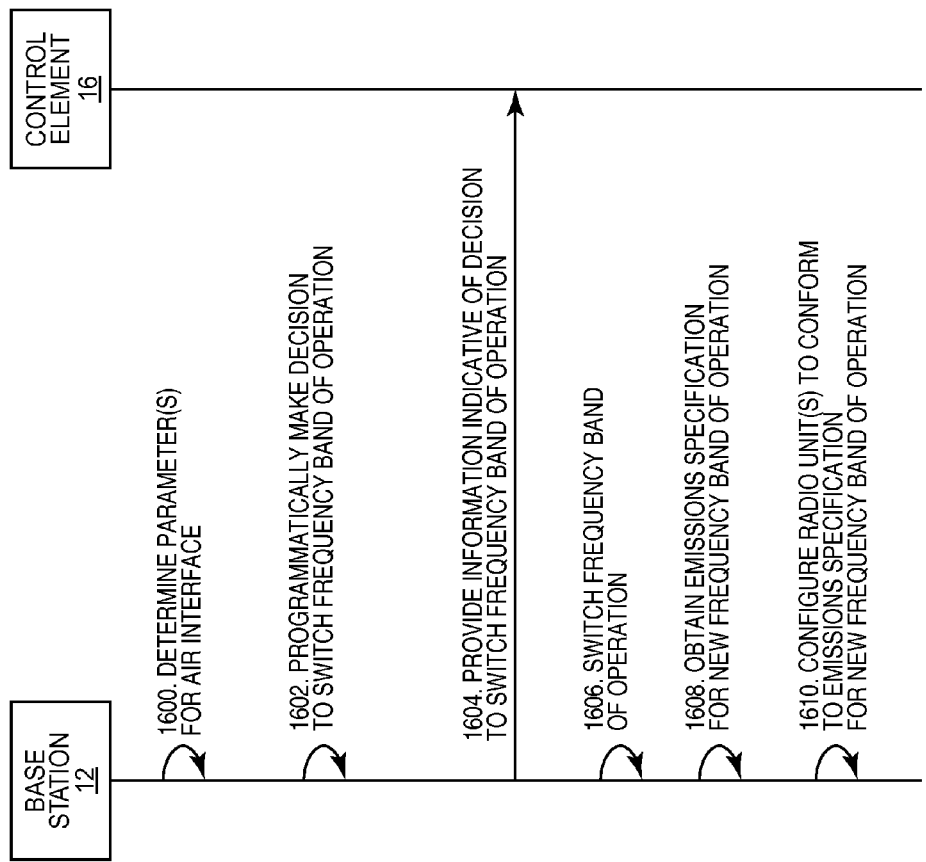
Figure 19:
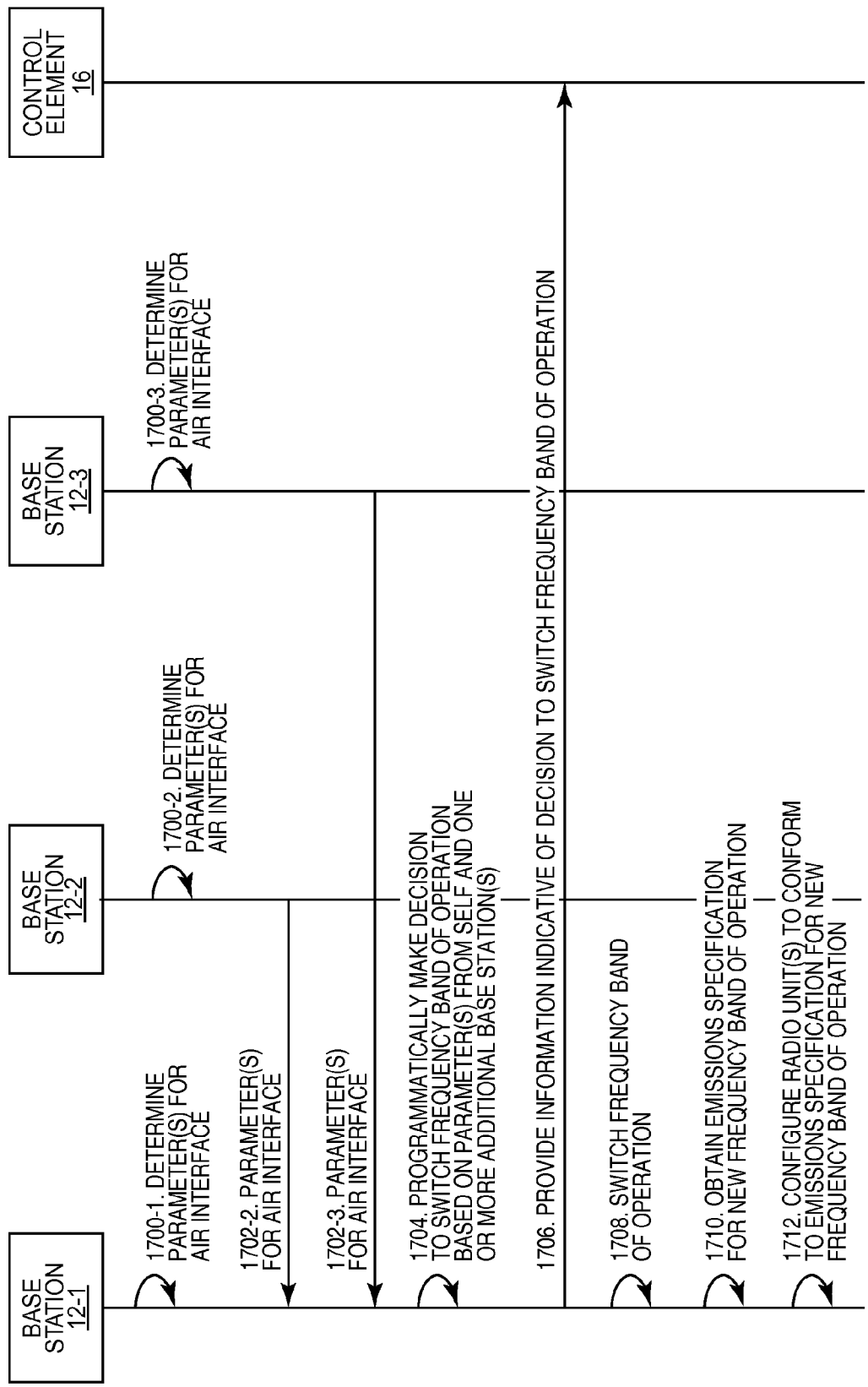
Figure 20:
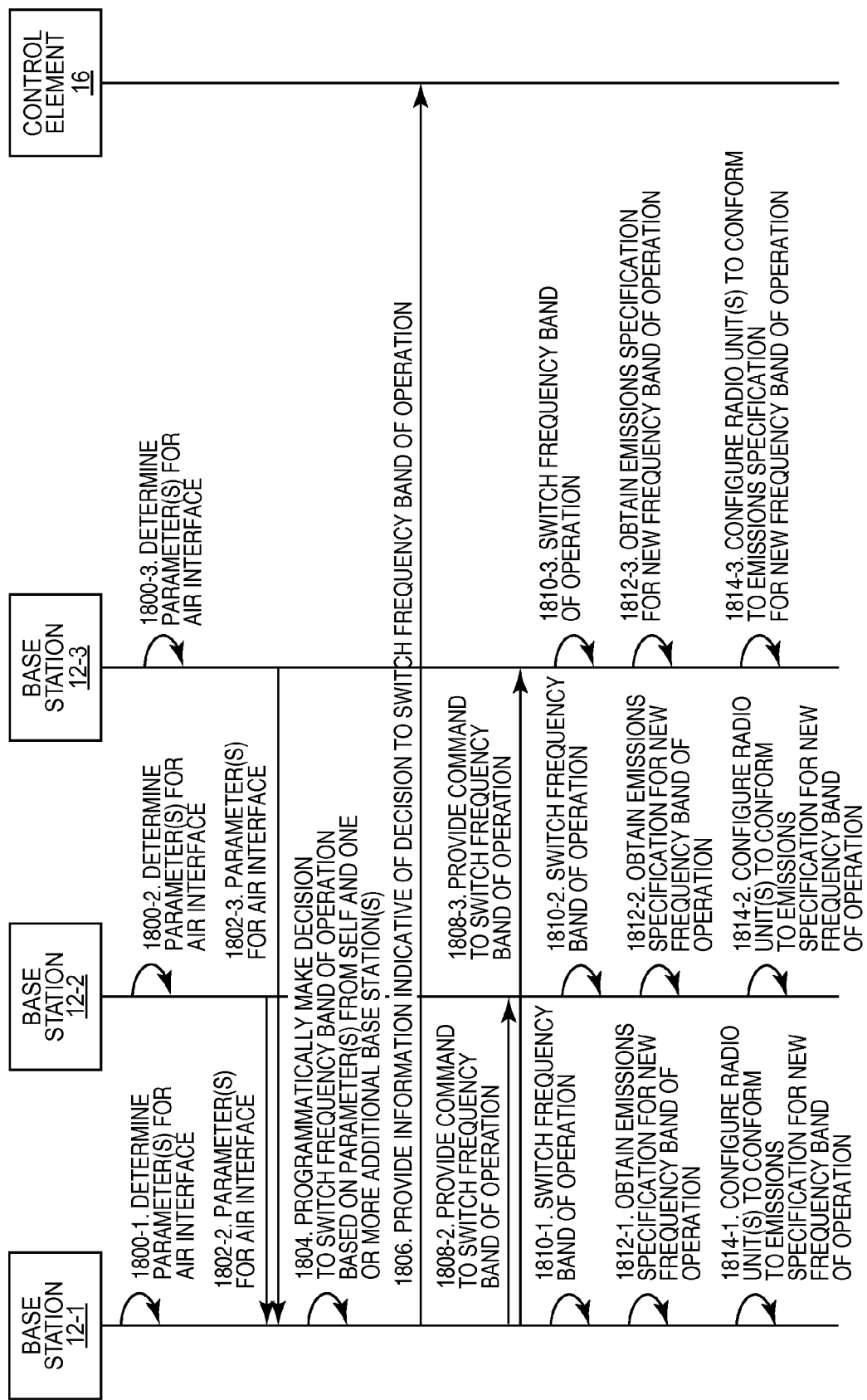
Figure 22:
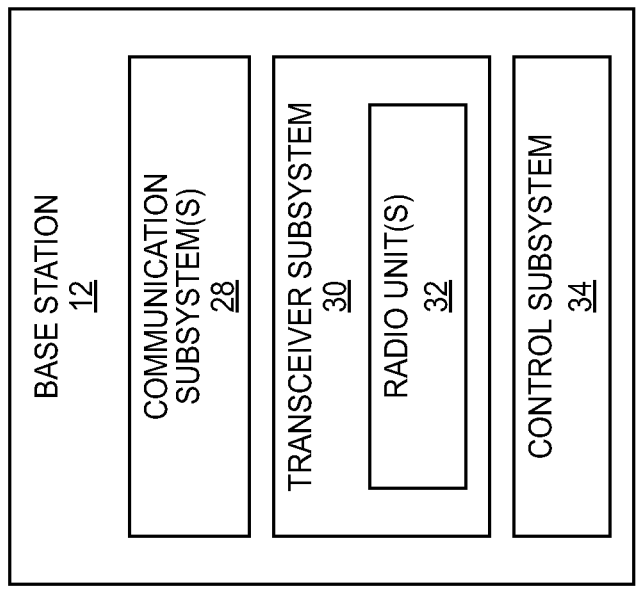
Figure 21:
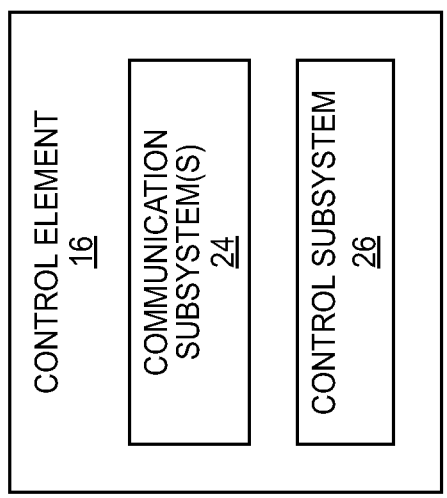

FIG. 6 illustrates the operation of the network controller and at least some of the base stations of FIG. 4 wherein the network controller programmatically decides to switch a frequency band of operation of the base station based on parameters for an air interface of the base station and parameters for air interfaces of one or more additional base stations according to another embodiment of the present disclosure;

FIG. 7 illustrates the operation of the network controller and at least some of the base stations of FIG. 4 wherein the network controller programmatically decides to switch a frequency band of operation of the base stations based on parameters for air interfaces of the base stations according to another embodiment of the present disclosure;

FIG. 8 illustrates an embodiment of the cellular communication network of FIG. 1 in which the control element is a command center that controls a frequency band of operation of one or more of the base stations based on user input from a human operator according to one embodiment of the present disclosure;

FIG. 9 illustrates the operation of the command center and one of the base stations of FIG. 8 wherein the command center obtains user input indicative of a decision to switch a frequency band of operation of the base station based on parameters of an air interface of the base station according to one embodiment of the present disclosure;

FIG. 10 illustrates the operation of the command center and at least some of the base stations of FIG. 8 wherein the command center obtains user input indicative of a decision to switch a frequency band of operation of the base station based on parameters for an air interface of the base station and parameters for air interfaces of one or more additional base stations according to another embodiment of the present disclosure;

FIG. 11 illustrates the operation of the command center and at least some of the base stations of FIG. 8 wherein the command center obtains user input indicative of a decision to switch a frequency band of operation of the base stations based on parameters for air interfaces of the base stations according to another embodiment of the present disclosure;

FIG. 12 illustrates another embodiment of the cellular communication network of FIG. 1 in which the control element is a network controller and the cellular communication network further includes a command center according to one embodiment of the present disclosure;

FIG. 13 illustrates the operation of the network controller of FIG. 12 according to one embodiment of the present disclosure;

FIGS. 14A and 14B illustrate the operation of the cellular communication network of FIG. 12 wherein the network controller operates according to the process of FIG. 13 to switch a frequency band of operation of a base station based on parameters of an air interface of the base station according to one embodiment of the present disclosure;

FIGS. 15A and 15B illustrate the operation of the cellular communication network of FIG. 12 wherein the network controller operates according to the process of FIG. 13 to switch a frequency band of operation of a base station based on parameters of an air interface of the base station and one or more additional base stations according to another embodiment of the present disclosure;

FIGS. 16A and 16B illustrate the operation of the cellular communication network of FIG. 12 wherein the network controller operates according to the process of FIG. 13 to switch a frequency band of operation of a number of base stations based on parameters of air interfaces of those base stations according to another embodiment of the present disclosure;

FIG. 17 illustrates an embodiment of the cellular communication network of FIG. 1 in which a base station controls a frequency band of operation of one or more base stations based on parameters of air interfaces of the one or more base stations according to one embodiment of the present disclosure;

FIG. 18 illustrates the operation of the cellular communication network of FIG. 17 wherein a base station switches a frequency band of operation of the base station based on parameters of an air interface of the base station according to one embodiment of the present disclosure;

FIG. 19 illustrates the operation of the cellular communication network of FIG. 17 wherein a base station switches a frequency band of operation of the base station based on parameters of an air interface of the base station and parameters of air interfaces of one or more additional base stations according to another embodiment of the present disclosure;

FIG. 20 illustrates the operation of the cellular communication network of FIG. 17 wherein a base station switches a frequency band of operation of the base station and one or more additional base stations based on parameters of an air interface of the base station and parameters of air interfaces of one or more additional base stations according to another embodiment of the present disclosure;

FIG. 21 is a block diagram of the control element of FIG. 1 according to one embodiment of the present disclosure; and FIG. 22 is a block diagram of the base station of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to controlling a frequency band of operation of one or more base stations in a cellular communication network based on associated parameters of air interfaces of the one or more base stations. In this regard, FIG. 1 illustrates a cellular communication network 10 including a number of base stations 12-1 through 12-N (generally referred to herein collectively as base stations 12 and individually as base station 12) that operate to serve wireless devices 14-1 through 14-M (generally referred to herein collectively as wireless devices 14 and individually as wireless device 14). The wireless devices 14 may be, for example, mobile phones, laptop or tablet computers equipped with cellular communication network interfaces, in-vehicle communication devices equipped with cellular communication network interfaces, or the like.

Each base station 12 includes one or more radio units (not shown) that enable wireless communication with the wireless devices 14 located within a serving area (e.g., cell) of the base station 12 via corresponding radio units (not shown) of the wireless devices 14. The base stations 12 and the wireless devices 14 operate according to a desired cellular communication standard (e.g., Long Term Evolution (LTE), WiMAX, Global System for Mobile Communications (GSM), etc.) to provide wireless communication in a predetermined frequency band of operation. Notably, in some embodiments, the base stations 12 and potentially the wireless devices 14 may be configured to operate according to multiple different standards. As used herein, a "frequency band of operation" is a band of frequencies allocated for downlinks from and/or uplinks to the base stations 12. Notably, the frequency band of operation is to be distinguished from a single carrier frequency or a set of carrier frequencies (e.g., for LTE, subcarriers for one or more resource blocks) within the frequency band of operation used for a downlink from one of the base stations 12 to one of the wireless devices 14 or a single carrier frequency or set of carrier frequencies within the frequency band of operation used for an uplink from one of the wireless devices 14 to one of the base stations 12. In one embodiment, the frequency band of operation for the base stations 12 (and thus the wireless devices 14) is a paired set of an uplink frequency band and a downlink frequency band. For example, the 3rd Generation Partnership Project (3GPP) has defined frequency band of operation 4 for LTE to include an uplink frequency band of 1710-1785 megahertz (MHz) and a downlink frequency band of 2110-2155 MHz. Other frequency bands of operation are unpaired frequency bands where the same frequency band is used for uplink and downlink. For example, 3GPP has defined frequency band of operation 41 for LTE as 2496-2690 MHz for both uplink and downlink.

Additionally, regulatory bodies such as the Federal Communications Commission (FCC) and Industry Canada define acceptable levels of transmit power inside the frequency band of operation as well as acceptable levels of transmit power for inadvertent transmission at frequencies outside of the frequency band of operation. Such operating requirements will be referred to herein as an air interface emissions specification and may include any subset of the requirements pertaining to acceptable radio performance for a given frequency band of operation.

The cellular communication network 10 also includes a control element 16. As discussed below in detail, the control element 16 is preferably either a network controller 18 (FIG. 4) or a command center 20 (FIG. 8). In general, the control element 16 controls the frequency band of operation of one or more of the base stations 12 either autonomously (i.e., programmatically) and/or under human control based on one or more parameters for air interfaces of one or more of the base stations 12. The air interfaces of the base stations 12 are provided by the radio units of the base stations 12. The one or more parameters for the air interfaces of the base stations 12 are preferably parameters that are indicative of the quality of the air interfaces of the base stations 12. For example, the one or more parameters for the air interfaces of the base stations 12 may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Figure 2:
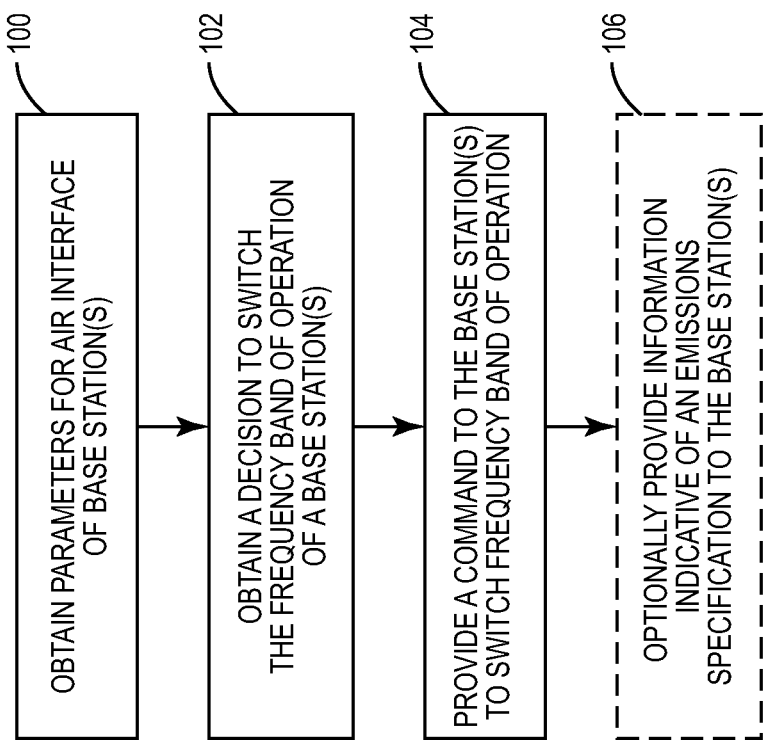
FIG. 2 illustrates the operation of the control element of FIG. 1 according to one embodiment of the present disclosure.

FIG. 2 illustrates the operation of the control element 16 of FIG. 1 according to one embodiment of the present disclosure. The control element 16 first obtains one or more parameters for an air interface of a radio unit of one or more of the base stations 12 (step 100). As discussed above, the one or more parameters for the air interface of each of the one or more base stations 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

The control element 16 then obtains a decision to switch a frequency band of operation of the one or more base stations 12 to a new frequency band of operation based on the one or more parameters for the air interface of the one or more base stations 12 (step 102). In other words, the control element 16 obtains a decision to switch the frequency band of operation of the one or more base stations 12 from a first frequency band of operation (i.e., a current frequency band of operation of the one or more base stations 12) to a second frequency band of operation (i.e., a new frequency band of operation) based on the one or more parameters for the air interface of the one or more base stations 12. As discussed below, the decision to switch the frequency band of operation of the one or more base stations 12 may be made autonomously, or programmatically, by the control element 16 or in response to user input from a human operator associated with the control element 16.

Next, in response to making the decision in step 102, the control element 16 provides a command to the one or more base stations 12 to switch the frequency band of operation of the one or more base stations 12 to the new frequency band of operation (step 104). Optionally, the control element 16 may also provide information indicative of an emissions specification for the new frequency band of operation to the one or more base stations 12 (step 106). Alternatively, the emissions specification for the new frequency band of operation may be otherwise obtained by the one or more base stations 12, as discussed below.

Figure 3:
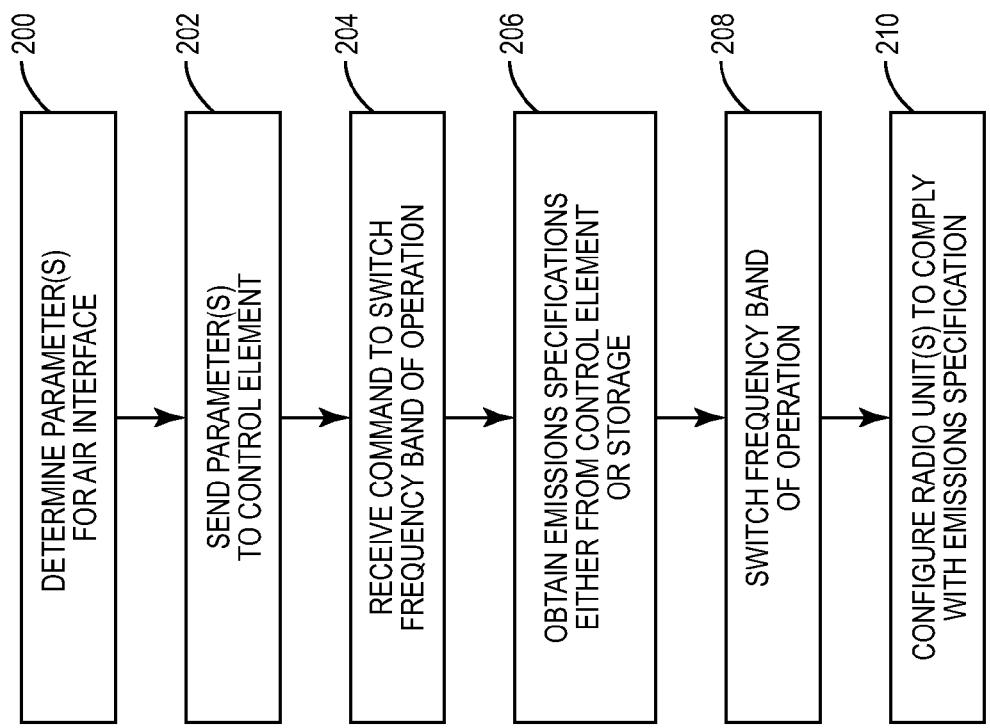
FIG. 3 illustrates the operation of one of the base stations of FIG. 1 according to one embodiment of the present disclosure.

FIG. 3 illustrates the operation of one of the base stations 12 of FIG. 1 according to one embodiment of the present disclosure. The base station 12 first determines one or more parameters for an air interface of the base station 12 (step 200). More specifically, the air interface of the base station 12 is provided by the one or more radio units of the base station 12. As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the base station 12 sends the one or more parameters for the air interface of the base station 12 to the control element 16 (step 202). The one or more parameters for the air interface of the base station 12 can be sent to the control element 16 using any suitable wired or wireless communication mechanism such as, for example, a wired or wireless backhaul network of the cellular communication network 10. Notably, steps 200 and 202 are preferably repeated as desired (e.g., periodically) such that the one or more parameters for the air interface of the base station 12 are updated and sent to the control element 16.

As discussed above, the control element 16 obtains a decision to switch the frequency band of operation of the base station 12 based on the one or more parameters for the air interface of the base station 12 and, in some embodiments, parameters for air interface(s) of one or more additional base stations 12. As such, the base station 12 receives a command from the control element 16 to switch the frequency band of operation of the base station 12 to a new frequency band of operation (step 204). In addition, in this embodiment, the base station 12 obtains information indicative of an emissions specification for the new frequency band of operation (step 206). In one embodiment, the information indicative of the emissions specification is communicated to the base station 12 from the control element 16. The information indicative of the emissions specification may be the actual emissions specification or a desired subset thereof or some predetermined identifier for the emissions specification that is mapped to the actual emissions specification or a desired subset thereof stored or otherwise available at the base station 12. In another embodiment, the emissions specification or a desired subset thereof is stored at the base station 12 so as to be accessible to the base station 12 upon receiving the command to switch to the new frequency band of operation. In one embodiment, the emissions specification contains a number of configuration parameter values (e.g., digital predistortion coefficient values) that enable the base station 12 to meet the emissions specification for the new frequency band of operation.

The base station 12 then switches the frequency band of operation to the new frequency band of operation in response to the command received in step 204 (step 208). More specifically, the base station 12 configures the one or more radio units of the base station 12 to operate in the new frequency band of operation. In addition, the base station 12 configures the one or more radio units to comply with the emissions specification for the new frequency band of operation (step 210). Notably, while illustrated separately, in some embodiments, steps 208 and 210 may be a single step.

FIG. 4 illustrates an embodiment of the cellular communication network 10 of FIG. 1 in which the control element 16 is a network controller 18 according to one embodiment of the present disclosure. The network controller 18 controls the frequency band of operation of one or more of the base stations 12 autonomously (i.e., programmatically) based on parameters for air interfaces of one or more of the base stations 12. For instance, in one embodiment the network controller 18 programmatically determines that one or more of the one or more parameters for air interfaces of the one or more base stations 12 indicates degraded performance of the one or more base stations 12. The network controller 18 then programmatically decides to change the frequency band of operation of the one or more base stations 12, which in turn at least partially alleviates the determined degradation of performance.

Figure 5:
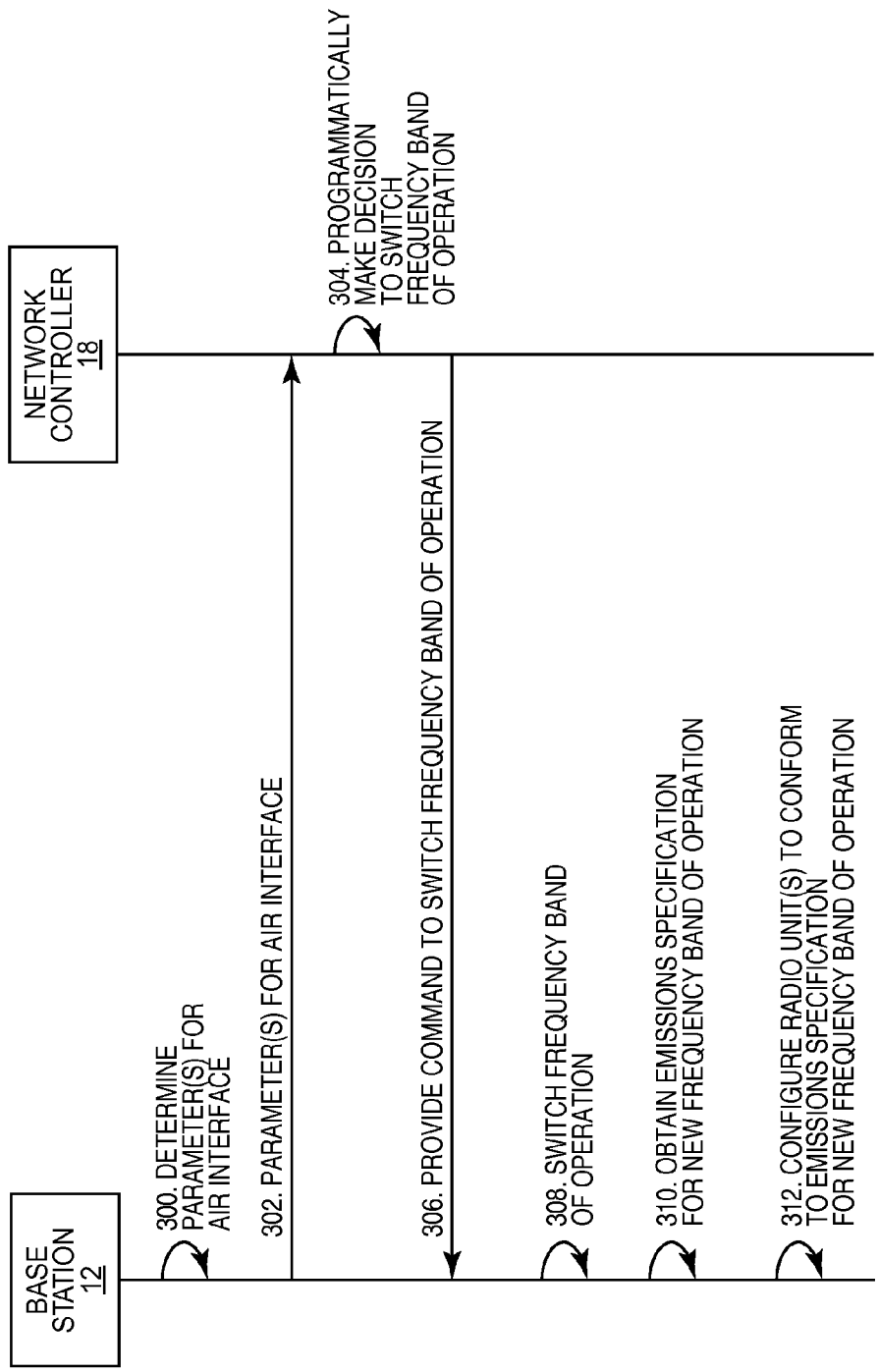
FIG. 5 illustrates the operation of the network controller and one of the base stations of FIG. 4 wherein the network controller programmatically decides to switch a frequency band of operation of the base station based on parameters for an air interface of the base station according to one embodiment of the present disclosure.

FIG. 5 illustrates the operation of the network controller 18 and one of the base stations 12 of FIG. 4 wherein the network controller 18 programmatically decides to switch a frequency band of operation of the base station 12 based on the one or more parameters for the air interface of the base station 12 according to one embodiment of the present disclosure. In this embodiment, the base station 12 determines the one or more parameters for the air interface of the base station 12 (step 300) and sends the one or more parameters for the air interface of the base station 12 to the network controller 18 (step 302). As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the network controller 18 programmatically makes the decision to switch the frequency band of operation of the base station 12 (step 304) and provides a command to switch the frequency band of operation of the base station 12 to the base station 12 (step 306). In response to the command, the base station 12 switches the frequency band of operation of the base station 12 (step 308). More specifically, the base station 12 configures the one or more radio units that provide the air interface of the base station 12 to operate in the new frequency band of operation. Optionally, the base station 12 also obtains an emissions specification for the new frequency band of operation and configures the one or more radio units that provide the air interface of the base station 12 to conform to the emissions specification for the new frequency band of operation (steps 310 and 312).

FIG. 6 illustrates the operation of the network controller 18 and at least some of the base stations 12 of FIG. 4 wherein the network controller 18 programmatically decides to switch a frequency band of operation of the base station 12 based on parameters for an air interface of the base station 12 and parameters for air interfaces of one or more additional base stations 12 according to another embodiment of the present disclosure. In this example, for clarity and ease of discussion, the base station 12-1 is the base station for which the network controller 18 decides to switch the frequency band of operation, and the base stations 12-2 through 12-5 are the one or more additional base stations whose parameters are considered by the network controller 18 when making the decision to switch the frequency band of operation of the base station 12-1. Note, however, that the network controller 18 may perform a similar process for any or all of the other base stations 12. Further, while this example uses the parameters of the air interfaces of four additional base stations 12 (e.g., parameters of air interfaces of four neighboring base stations 12 of the base station 12-1), the parameters of air interfaces of any number of additional base stations 12 may be used depending on the particular implementation.

As illustrated, the base stations 12-1 through 12-5 determine one or more parameters for the air interfaces of the respective base stations 12-1 through 12-5 (steps 400-1 through 400-5) and send the one or more parameters for the air interfaces of the base stations 12-1 through 12-5 to the network controller 18 (steps 402-1 through 402-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

The network controller 18 programmatically makes the decision to switch the frequency band of operation of one of the plurality of base stations 12, which in this example is the base station 12-1, to a new frequency band of operation based on the one or more parameters for the air interfaces of the base stations 12-1 through 12-5 (step 404). In one embodiment, by using the one or more parameters for the air interfaces of the additional base stations 12-2 through 12-5, the network controller 18 is able to make a more informed decision about whether to switch the frequency band of operation of the base station 12-1 and/or which frequency band of operation to switch the base station 12-1. Once the decision in step 404 is made, the network controller 18 sends a command to switch the frequency band of operation of the base station 12-1 to the new frequency band of operation (step 406).

In response to the command from the network controller 18, the base station 12-1 switches the frequency band of operation of the base station 12-1 to the new frequency band of operation (step 408). More specifically, the base station 12-1 configures the one or more radio units of the base station 12-1 to operate in the new frequency band of operation. Optionally, the base station 12-1 also obtains an emissions specification for the new frequency band of operation (step 410) and configures the one or more radio units that provide the air interface of the base station 12-1 to conform to the emissions specification for the new frequency band of operation (step 412). Again, the base station 12-1 may obtain information indicative of the emissions specification for the new frequency band of operation from, for example, either the network controller 18 or from local storage.

FIG. 7 illustrates the operation of the network controller 18 and at least some, but potentially all, of the base stations 12 of FIG. 4 wherein the network controller 18 programmatically decides to switch a frequency band of operation of the base stations 12 based on parameters for air interfaces of the base stations 12 according to another embodiment of the present disclosure. In this example, for clarity and ease of discussion, the base stations 12-1 through 12-5 are the base stations for which the network controller 18 decides to switch the frequency band of operation, and the base stations 12-1 through 12-5 are the one or more base stations whose parameters are considered by the network controller 18 when making the decision to switch the frequency band of operation of the base stations 12-1 through 12-5. Note, however, that the network controller 18 may perform a similar process for any or all of the other base stations 12. Further, while this example uses the parameters of air interfaces of five base stations 12-1 through 12-5, the parameters of air interfaces of any number of additional base stations 12 may be used depending on the particular implementation.

First, the base stations 12-1 through 12-5 determine one or more parameters for the air interfaces of the respective base stations 12-1 through 12-5 (steps 500-1 through 500-5) and send the one or more parameters for the air interfaces of the base stations 12-1 through 12-5 to the network controller 18 (steps 502-1 through 502-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the network controller 18 programmatically makes the decision to switch the frequency band of operation of the base stations 12-1 through 12-5 (step 504) and provides a command to switch the frequency band of operation to the plurality of base stations 12-1 through 12-5 (steps 506-1 through 506-5). In one embodiment, by using the one or more parameters for the air interfaces of the base stations 12-1 through 12-5 in order to programmatically make the decision to switch the frequency band of operation of the base stations 12-1 through 12-5, the network controller 18 is able to make a more informed decision about whether to switch the frequency band of operation of the base stations 12-1 through 12-5 and/or which frequency band of operation to switch the base stations 12-1 through 12-5.

In response to receiving the command from the network controller 18, each of the base stations 12-1 through 12-5 then switches its frequency band of operation to a new frequency band of operation identified by the command (steps 508-1 through 508-5). Optionally, each of the base stations 12-1 through 12-5 may additionally obtain an emissions specification for the new frequency band of operation (steps 510-1 through 510-5) and configure the one or more radio units that provide the air interface of the base stations 12-1 through 12-5 to conform to the emissions specification for the new frequency band of operation (steps 512-1 through 512-5).

FIG. 8 illustrates an embodiment of the cellular communication network 10 of FIG. 1 in which the control element 16 is a command center 20 according to one embodiment of the present disclosure. In general, the command center 20 receives parameters for the air interfaces of one or more of the base stations 12 and presents information indicative of the parameters to a human operator 22. The information may include, for example, information indicating that the various parameters for the air interface of the one or more base stations 12 have either risen above or fallen below corresponding predefined threshold values indicating degraded performance of the one or more base stations 12. In addition or alternatively, the information may include the parameters themselves or any information derived from the parameters that would facilitate the decision to be made by the human operator 22. In response to presenting the information to the human operator 22, the command center 20 receives a decision to switch a frequency band of operation of one or more of the base stations 12 from the human operator 22 and then sends a corresponding command to the one or more base stations 12. For instance, the human operator 22 may decide that changing the frequency band of operation of the one or more base stations 12 could at least partially alleviate some determined degradation of performance or otherwise achieve a desired performance characteristic.

FIG. 9 illustrates the operation of the command center 20 and one of the base stations 12 of FIG. 8 wherein the command center 20 switches a frequency band of operation of the base station 12 based on parameters of the air interface of the base station 12 according to one embodiment of the present disclosure. First, the base station 12 determines one or more parameters for the air interface of the base station 12 (step 600) and sends the one or more parameters for the air interface of the base station 12 to the command center 20 (step 602). As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the command center 20 presents information indicative of the one or more parameters to the human operator 22 (step 604). In this example, the command center 20 then receives user input from the human operator 22 that is indicative of a decision to switch the frequency band of operation of the base station 12 (step 606). Notably, the user input preferably indicates a new frequency band of operation for the base station 12. In response, the command center 20 sends a command to switch the frequency band of operation of the base station 12 to the new frequency band of operation to the base station 12 (step 608). The base station 12 then switches the frequency band of operation to the new frequency band of operation (step 610). More specifically, the base station 12 configures the one or more radio units that provide the air interface of the base station 12 to operate in the new frequency band of operation. Optionally, the base station 12 may also obtain emissions specification for the new frequency band of operation (step 612) and configure the one or more radio units that provide the air interface of the base station 12 to conform to the emissions specification for the new frequency band of operation (step 614).

FIG. 10 illustrates the operation of the command center 20 to switch the frequency band of operation of one of the base stations 12 based on parameters for an air interface of the base station 12 and parameters for air interfaces of one or more additional base stations 12 according to another embodiment of the present disclosure. In this example, for clarity and ease of discussion, the base station 12-1 is the base station for which the command center 20 decides to switch the frequency band of operation, and the base stations 12-2 through 12-5 are the one or more additional base stations whose parameters are considered when making the decision to switch the frequency band of operation of the base station 12-1. Note, however, that the command center 20 may perform a similar process for any or all of the other base stations 12. Further, while this example uses the parameters of air interfaces of four additional base stations 12 (e.g., parameters of air interfaces of four neighboring base stations 12 of the base station 12-1), the parameters of air interfaces of any number of additional base stations 12 may be used depending on the particular implementation.

First, the base stations 12-1 through 12-5 determine one or more parameters for the air interfaces of the respective base stations 12-1 through 12-5 (steps 700-1 through 700-5). The base stations 12-1 through 12-5 send the one or more parameters for the air interfaces of the base stations 12-1 through 12-5 to the command center 20 (steps 702-1 through 702-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

The command center 20 presents information indicative of the one or more parameters to the human operator 22 via a user interface component of the command center 20 (step 704). In response, the command center 20 receives user input from the human operator 22 that is indicative of a decision to switch the frequency band of operation of the base station 12-1 to a new frequency band of operation (step 706). The command center 20 then sends a command to switch the frequency band of operation of the base station 12-1 to the new frequency band of operation to the base station 12-1 (step 708). The base station 12-1 then switches the frequency band of operation to the new frequency band of operation (step 710). Optionally, the base station 12-1 may also obtain an emissions specification for the new frequency band of operation (step 712) and configure the one or more radio units that provide the air interface of the base station 12-1 to conform to the emissions specification for the new frequency band of operation (step 714).

FIG. 11 illustrates the operation of the command center 20 of FIG. 8 to switch the frequency band of operation of at least some of the base stations 12 based on parameters for air interfaces of those base stations 12 according to another embodiment of the present disclosure. In this example, for clarity and ease of discussion, the base stations 12-1 through 12-5 are the base stations for which the command center 20 decides to switch the frequency band of operation, and the base stations 12-1 through 12-5 are the base stations whose parameters are considered by the human operator 22 when making the decision to switch the frequency band of operation of the base stations 12-1 through 12-5. Note, however, that the command center 20 may perform a similar process for any or all of the other base stations 12. Further, while this example uses the parameters of air interfaces of five base stations 12, the parameters of air interfaces of any number of base stations 12 may be used depending on the particular implementation.

First, the base stations 12-1 through 12-5 determine one or more parameters for the air interfaces of the respective base stations 12-1 through 12-5 (steps 800-1 through 800-5) and send the one or more parameters for the air interfaces of the base stations 12-1 through 12-5 to the command center 20 (steps 802-1 through 802-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the command center 20 presents information indicative of the one or more parameters to the human operator 22 via a user interface component (step 804). In response, the command center 20 receives user input from the human operator 22 indicative of a decision to switch the frequency band of operation of the base stations 12-1 through 12-5 to a new frequency band of operation (step 806). The command center 20 then sends a command to switch the frequency band of operation of the base stations 12-1 through 12-5 to the new frequency band of operation to the base stations 12-1 through 12-5 (steps 808-1 through 808-5). Each of the base stations 12-1 through 12-5 then switches the frequency band of operation to the new frequency band of operation (steps 810-1 through 810-5). Optionally, the base stations 12-1 through 12-5 may obtain an emissions specification for the new frequency band of operation (steps 812-1 through 812-5) and configure the one or more radio units that provide the air interface of the base stations 12-1 through 12-5 to conform to the emissions specification for the new frequency band of operation (steps 814-1 through 814-5).

FIG. 12 illustrates another embodiment of the cellular communication network 10 of FIG. 1. In this embodiment, the cellular communication network 10 includes both the network controller 18 and the command center 20. In general, the network controller 18 operates to programmatically decide to switch the frequency band of operation of one or more of the base stations 12 in some scenarios, whereas the network controller 18 obtains a decision to switch the frequency band of operation of one or more of the base stations 12 from the human operator 22 via the command center 20 in other scenarios. For instance, in one embodiment the network controller 18 determines if one or more predefined criteria are satisfied based on one or more parameters for the air interfaces from the one or more base stations 12. If the one or more predefined criteria are satisfied, the network controller 18 programmatically makes the decision to switch the frequency band of operation of one or more of the base stations 12 based on the one or more parameters for the air interfaces of the one or more base stations 12. If the one or more predefined criteria are not satisfied, the network controller 18 obtains a decision to switch the frequency band of operation of one or more of the base stations 12 from the human operator 22 via the command center 20.

FIG. 13 illustrates the operation of the network controller 18 of FIG. 12 according to one embodiment of the present disclosure. First, the network controller 18 obtains one or more parameters for the air interfaces of one or more of the base stations 12 (step 900). Based on one or more predefined criteria, the network controller 18 then determines whether the decision regarding whether to switch the frequency band of operation can be made locally at the network controller 18 via an autonomous, or programmatic, process (step 902). The one or more predefined criteria may be one or more rules that are based on, for example, the one or more parameters of the air interfaces of the one or more base stations 12. However, the one or more predefined criteria are not limited thereto. Further, the one or more criteria may vary depending on the particular implementation.

If the network controller 18 determines that the decision regarding whether to switch the frequency band of operation cannot be made locally, the network controller 18 provides the one or more parameters for the air interfaces of the one or more base stations 12 to the command center 20 (step 904). In response, the network controller 18 receives a decision to switch the frequency band of operation of the one or more base stations 12 to a new frequency band of operation from the command center 20 (step 906). In this case, as discussed above, the decision is made by the human operator 22 based on information that is indicative of the one or more parameters for the air interfaces of the one or more base stations 12.

Conversely, if the network controller 18 determines that the decision regarding whether to switch the frequency band of operation can be made locally in step 902, the network controller 18 programmatically decides to switch the frequency band of operation of the one or more base stations 12 to the new frequency band of operation based on the one or more parameters for the air interfaces of the one or more base stations 12 (step 908). Once the network controller 18 has obtained the decision to switch the frequency band of operation of the one or more base stations 12 either from the command center 20 or programmatically, the network controller 18 provides a command to the one or more base stations 12 to switch the frequency band of operation of the one or more base stations 12 to the new frequency band of operation (step 910).

FIGS. 14A and 14B illustrate the operation of the cellular communication network 10 of FIG. 12 wherein the network controller 18 operates according to the process of FIG. 13 to switch a frequency band of operation of a base station 12 based on parameters of the air interface of the base station 12 according to one embodiment of the present disclosure. FIG. 14A illustrates the operation of the cellular communication network 10 of FIG. 12 when the decision to the switch frequency band of operation is made by the human operator 22 at the command center 20. Conversely, FIG. 14B illustrates the operation of the cellular communication network 10 of FIG. 12 when the decision to switch the frequency band of operation is made locally at the network controller 18.

More specifically, in FIG. 14A, the base station 12 determines one or more parameters for the air interface of the base station 12 (step 1000) and sends the one or more parameters for the air interface of the base station 12 to the network controller 18 (step 1002). As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the network controller 18 determines that a decision on whether to switch the frequency band of operation of the base station 12 cannot be made locally at the network controller 18 (step 1004). As such, the network controller 18 sends the one or more parameters for the air interface of the base station 12 to the command center 20 (step 1006). Then, the command center 20 presents information indicative of the one or more parameters for the air interface of the base station 12 to the human operator 22 via a user interface component (step 1008). In response, the command center 20 receives user input from the human operator 22 that is indicative of a decision to switch the frequency band of operation of the base station 12 to a new frequency band of operation (step 1010). The command center 20 then provides the decision to switch the frequency band of operation of the base station 12 to the network controller 18 (step 1012).

In response to receiving the decision to switch the frequency band of operation of the base station 12, the network controller 18 provides a command to switch the frequency band of operation of the base station 12 to the new frequency band of operation to the base station 12 (step 1014). The base station 12 then switches the frequency band of operation to the new frequency band of operation (step 1016). Optionally, the base station 12 may also obtain an emissions specification for the new frequency band of operation (step 1018) and configure the one or more radio units that provide the air interface of the base station 12 to conform to the emissions specification for the new frequency band of operation (step 1020).

In FIG. 14B, first the base station 12 determines one or more parameters for the air interface of the base station 12 (step 1100) and sends the one or more parameters for the air interface of the base station 12 to the network controller 18 (step 1102). As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the network controller 18 determines that the decision regarding whether to switch the frequency band of operation of the base station 12 can be made locally at the network controller 18 (step 1104). As such, the network controller 18 programmatically makes the decision to switch the frequency band of operation of the base station 12 based on the one or more parameters for the air interface of the base station 12 (step 1106). The network controller 18 then sends a command to switch the frequency band of operation of the base station 12 to a new frequency band of operation to the base station 12 (step 1108). The base station 12 then switches the frequency band of operation to the new frequency band of operation (step 1110). Optionally, the base station 12 may obtain an emissions specification for the new frequency band of operation (step 1112) and configure the one or more radio units that provide the air interface of the base station 12 to conform to the emissions specification for the new frequency band of operation (step 1114). Notably, the process of FIG. 14B does not include any involvement from the command center 20 or the human operator 22. This can allow for faster decisions in these situations and a minimization of the time required by the human operator 22.

FIGS. 15A and 15B illustrate the operation of the cellular communication network 10 of FIG. 12 wherein the network controller 18 operates according to the process of FIG. 13 to switch a frequency band of operation of one of the base stations 12 based on one or more parameters of the air interface of the base station 12 and one or more additional base stations 12 according to another embodiment of the present disclosure. FIG. 15A illustrates the scenario where the decision regarding whether to switch the frequency band of operation of the base station 12 cannot be made locally at the network controller 18. Conversely, FIG. 15B illustrates the scenario where the decision regarding whether to switch the frequency band of operation of the base station 12 can be made locally at the network controller 18.

In these examples, for clarity and ease of discussion, the base station 12-1 is the base station for which the decision is made to switch the frequency band of operation, and the base stations 12-2 through 12-5 are the one or more additional base stations 12 whose one or more parameters of the air interfaces are considered when making the decision to switch the frequency band of operation of the base station 12-1. Note, however, that this process may be performed for any or all of the other base stations 12. Further, while this example uses the one or more parameters of the air interfaces of four additional base stations 12-2 through 12-5, the one or more parameters of the air interfaces of any number of additional base stations 12 may be used depending on the particular implementation.

In FIG. 15A, first the base stations 12-1 through 12-5 determine one or more parameters for the air interfaces of the base stations 12-1 through 12-5 (steps 1200-1 through 1200-5) and send the one or more parameters for the air interfaces of the base stations 12-1 through 12-5 to the network controller 18 (steps 1202-1 through 1202-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-5, or the like.

Next, the network controller 18 determines that the decision regarding whether to switch the frequency band of operation of the base station 12-1 cannot be made locally at the network controller 18 (step 1204). As such, the network controller 18 sends the one or more parameters for the air interfaces of the base stations 12-1 through 12-5 to the command center 20 (step 1206). Then, the command center 20 presents information indicative of the one or more parameters to the human operator 22 via a user interface component (step 1208). In response, the command center 20 receives user input from the human operator 22 that is indicative of a decision to switch the frequency band of operation of the base station 12-1 to a new frequency band of operation (step 1210). The command center 20 then sends the decision to switch the frequency band of operation of the base station 12-1 to the new frequency band of operation to the network controller 18 (step 1212).

Next, the network controller 18 sends a command to switch the frequency band of operation of the base station 12-1 to the new frequency band of operation to the base station 12-1 (step 1214). The base station 12-1 then switches the frequency band of operation to the new frequency band of operation (step 1216). Optionally, the base station 12-1 may also obtain an emissions specification for the new frequency band of operation (step 1218) and configure the one or more radio units that provide the air interface of the base station 12-1 to conform to the emissions specification for the new frequency band of operation (step 1220).

In the embodiment of FIG. 15B, the base stations 12-1 through 12-5 determine one or more parameters for the air interfaces of the base stations 12-1 through 12-5 (steps 1300-1 through 1300-5) and send the one or more parameters for the air interfaces of the base stations 12-1 through 12-5 to the network controller 18 (steps 1302-1 through 1302-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-5, or the like.

Next, the network controller 18 determines that the decision regarding whether to switch the frequency band of operation of the base station 12-1 can be made locally at the network controller 18 (step 1304). As such, the network controller 18 programmatically makes the decision to switch the frequency band of operation of the base station 12-1 to a new frequency band of operation (step 1306). The network controller 18 then sends a command to switch the frequency band of operation of the base station 12-1 to the new frequency band of operation to the base station 12-1 (step 1308). In response, the base station 12-1 switches the frequency band of operation to the new frequency band of operation (step 1310). Optionally, the base station 12-1 may also obtain an emissions specification for the new frequency band of operation (step 1312) and configure the one or more radio units that provide the air interface of the base station 12-1 to conform to the emissions specification for the new frequency band of operation (step 1314). Notably, the process of FIG. 15B does not include any involvement from the command center 20 or the human operator 22. This can allow for faster decisions in these situations and a minimization of the time required by the human operator 22.

FIGS. 16A and 16B illustrate the operation of the cellular communication network 10 of FIG. 12 wherein the network controller 18 operates according to the process of FIG. 13 to switch a frequency band of operation of a number of the base stations 12 based on one or more parameters of air interfaces of those base stations 12 according to another embodiment of the present disclosure. In general, FIG. 16A illustrates the scenario where the decision regarding whether to switch the frequency band of operation of the base stations 12 cannot be made locally at the network controller 18. Conversely, FIG. 16B illustrates the scenario where the decision regarding whether to switch the frequency band of operation of the base stations 12 can be made locally at the network controller 18.

In these examples, for clarity and ease of discussion, the base stations 12-1 through 12-5 are the base stations 12 for which the decision is made to switch the frequency band of operation, and the base stations 12-1 through 12-5 are the base stations 12 whose one or more parameters of the air interfaces are considered when making the decision to switch the frequency band of operation of the base stations 12-1 through 12-5. Note, however, that a similar process may be performed for any or all of the other base stations 12. Further, while this example uses the one or more parameters of the air interfaces of five base stations 12-1 through 12-5, the one or more parameters of the air interfaces of any number of additional base stations 12 may be used depending on the particular implementation.

In the embodiment of FIG. 16A, the base stations 12-1 through 12-5 determine one or more parameters for the air interfaces of the base stations 12-1 through 12-5 (steps 1400-1 through 1400-5) and send the one or more parameters for the air interfaces of the base stations 12-1 through 12-5 to the network controller 18 (steps 1402-1 through 1402-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-5, or the like.

Next, the network controller 18 determines that a decision regarding whether to switch the frequency band of operation of the base stations 12-1 through 12-5 cannot be made locally at the network controller 18 (step 1404). As such, the network controller 18 sends the one or more parameters for the air interfaces of the base stations 12-1 through 12-5 to the command center 20 (step 1406). Then, the command center 20 presents information indicative of the one or more parameters to the human operator 22 via a user interface component (step 1408). In response, the command center 20 receives user input from the human operator 22 that is indicative of a decision to switch the frequency band of operation of the base stations 12-1 through 12-5 to a new frequency band of operation (step 1410). The command center 20 then sends the decision to switch the frequency band of operation of the base stations 12-1 through 12-5 to the new frequency band of operation to the network controller 18 (step 1412).

In response, the network controller 18 provides a command to switch the frequency band of operation of the base stations 12-1 through 12-5 to the new frequency band of operation to the base stations 12-1 through 12-5 (steps 1414-1 through 1414-5). The base stations 12-1 through 12-5 then switch the frequency band of operation to the new frequency band of operation (steps 1416-1 through 1416-5). Optionally, the base stations 12-1 through 12-5 may obtain an emissions specification for the new frequency band of operation (steps 1418-1 through 1418-5) and configure the one or more radio units that provide the air interfaces of the base stations 12-1 through 12-5 to conform to the emissions specification for the new frequency band of operation (steps 1420-1 through 1420-5).

In the embodiment of FIG. 16B, the base stations 12-1 through 12-5 determine one or more parameters for the air interfaces of the base stations 12-1 through 12-5 (steps 1500-1 through 1500-5) and send the one or more parameters for the air interfaces of the base stations 12-1 through 12-5 to the network controller 18 (steps 1502-1 through 1502-5). As discussed above, the one or more parameters for the air interface of each of the base stations 12-1 through 12-5 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-5, or the like.

Next, the network controller 18 determines that a decision regarding whether to switch the frequency band of operation of the base stations 12-1 through 12-5 can be made locally at the network controller 18 (step 1504). As such, the network controller 18 programmatically makes the decision to switch the frequency band of operation of the base stations 12-1 through 12-5 to a new frequency band of operation (step 1506). The network controller 18 then sends a command to switch the frequency band of operation of the base stations 12-1 through 12-5 to the new frequency band of operation to the base stations 12-1 through 12-5 (steps 1508-1 through 1508-5). The base stations 12-1 through 12-5 then switch the frequency band of operation to the new frequency band of operation (steps 1510-1 through 1510-5). Optionally, the base stations 12-1 through 12-5 may obtain an emissions specification for the new frequency band of operation (steps 1512-1 through 1512-5) and configure the one or more radio units that provide the air interfaces of the base stations 12-1 through 12-5 to conform to the emissions specification for the new frequency band of operation (steps 1514-1 through 1514-5). Notably, the process of FIG. 16B does not include any involvement from the command center 20 or the human operator 22. This can allow for faster decisions in these situations and a minimization of the time required by the human operator 22.

FIG. 17 illustrates another embodiment of the cellular communication network 10 of FIG. 1 in which one of the base stations 12 controls a frequency band of operation of one or more of the base stations 12 based on one or more parameters of the air interfaces of one or more of the base stations 12. This embodiment is similar to those described above, but where the base station 12, rather than the control element 16, makes the decision as to whether to switch the frequency band of operation of the base station 12 and, in some embodiments, at least some of the other base stations 12. In one embodiment, upon making the decision to switch the frequency band of operation, the base station 12 notifies the control element 16 of the decision to switch the frequency band of operation.

FIG. 18 illustrates the operation of the cellular communication network 10 of FIG. 17 according to one embodiment of the present disclosure. In this embodiment, one of the base stations 12 makes a decision to switch a frequency band of operation of the base station 12 based on one or more parameters of the air interface of the base station 12. First, the base station 12 determines the one or more parameters for the air interface of the base station 12 (step 1600). As discussed above, the one or more parameters for the air interface of the base station 12 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base station 12, or the like.

Next, the base station 12 programmatically makes the decision to switch the frequency band of operation of the base station 12 to a new frequency band of operation based on the one or more parameters for the air interface of the base station 12 (step 1602). In one embodiment, the decision to switch to the new frequency band of operation is made by the base station 12 without collaboration with any other base stations 12. In another embodiment, the decision is made via collaboration with one or more additional base stations 12. As an example, each of the base stations 12 could vote to switch its frequency band of operation. Then, a consensus decision of the base station 12 and the one or more additional base stations 12 is determined based on the votes. This consensus decision is then adopted by the base station 12 as its decision to switch the frequency band of operation of the base station 12 to a new frequency band of operation.

Preferably, the base station 12 provides information indicative of the decision to switch the frequency band of operation of the base station 12 to the control element 16 (step 1604). In response to the decision, the base station 12 configures the one or more radio units that provide the air interface of the base station 12 to switch the frequency band of operation of the base station 12 to the new frequency band of operation (step 1606). Optionally, the base station 12 may obtain an emissions specification for the new frequency band of operation (step 1608) and configure the one or more radio units that provide the air interface of the base station 12 to conform to the emissions specification for the new frequency band of operation (step 1610).

FIG. 19 illustrates the operation of the cellular communication network 10 of FIG. 17 according to another embodiment of the present disclosure. In this embodiment, one of the base stations 12 switches a frequency band of operation of the base station 12 based on one or more parameters of the air interface of the base station 12 and one or more parameters of the air interface of one or more additional base stations 12 according to another embodiment of the present disclosure. In this example, for clarity and ease of discussion, the base station 12-1 is the base station 12 making the decision to switch the frequency band of operation, and the base stations 12-2 and 12-3 are the one or more additional base stations 12 whose one or more parameters of air interfaces are considered by the base station 12-1 when making the decision to switch the frequency band of operation of the base station 12-1. Note, however, that the other base stations 12 may perform a similar process. Further, while this example uses the one or more parameters of the air interfaces of two additional base stations 12 (e.g., one or more parameters of air interfaces of two neighboring base stations 12 of the base station 12-1), the one or more parameters of air interfaces of any number of additional base stations 12 may be used depending on the particular implementation.

In this embodiment, the base stations 12-1 through 12-3 determine the one or more parameters for the air interfaces of the base stations 12-1 through 12-3 (steps 1700-1 through 1700-3). The base stations 12-2 and 12-3 send the one or more parameters for the air interfaces of the base stations 12-2 and 12-3 to the base station 12-1 (steps 1702-2 and 1702-3). As discussed above, the one or more parameters for the air interfaces of each of the base stations 12-1 through 12-3 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-3, or the like.

Then, the base station 12-1 programmatically makes the decision to switch the frequency band of operation of the base station 12-1 to a new frequency band of operation based on the one or more parameters for the air interfaces of the base stations 12-1 through 12-3 (step 1704). In one embodiment, the decision to switch to the new frequency band of operation is made by the base station 12-1 without collaboration with any other base stations 12. In another embodiment, the decision is made via collaboration with one or more additional base stations 12, such as the base stations 12-2 and 12-3. As an example, each of the base stations 12 could vote to switch its frequency band of operation based on the one or more air interface parameters for its own air interface and the one or more air interface parameters for the air interfaces of the other base stations 12. Then, a consensus decision of the base station 12-1 and the one or more additional base stations 12 is determined based on the votes. This consensus decision is then adopted by the base station 12-1 as its decision to switch the frequency band of operation of the base station 12-1 to a new frequency band of operation.

Preferably, the base station 12-1 provides information indicative of the decision to switch the frequency band of operation of the base station 12-1 to the control element 16 (step 1706). In response to the decision, the base station 12-1 configures the one or more radio units that provide the air interface of the base station to switch the frequency band of operation of the base station 12-1 to the new frequency band of operation (step 1708). Optionally, the base station 12-1 may obtain an emissions specification for the new frequency band of operation (step 1710) and configure the one or more radio units that provide the air interface of the base station 12-1 to conform to the emissions specification for the new frequency band of operation (step 1712).

FIG. 20 illustrates the operation of the cellular communication network 10 of FIG. 17 according to another embodiment of the present disclosure. In general, in this embodiment, one of the base stations 12 switches a frequency band of operation of the base station 12 and one or more additional base stations 12 based on one or more parameters of an air interface of the base station 12 and one or more parameters of an air interface of one or more additional base stations 12. In this example, for clarity and ease of discussion, the base station 12-1 is the base station 12 that makes the decision to switch the frequency band of operation of the base station 12-1 and one or more additional base stations 12, and the base stations 12-2 and 12-3 are the one or more additional base stations 12. Note, however, that the other base stations 12 may perform a similar process. Further, while this example uses the one or more parameters of air interfaces of two additional base stations 12 (e.g., one or more parameters of air interfaces of two neighboring base stations 12 of the base station 12-1), the one or more parameters of air interfaces of any number of additional base stations 12 may be used depending on the particular implementation.

In this embodiment, the base stations 12-1 through 12-3 determine the one or more parameters for the air interfaces of the base stations 12-1 through 12-3 (steps 1800-1 through 1800-3). The base stations 12-2 and 12-3 send the one or more parameters for the air interfaces of the base stations 12-2 and 12-3 to the base station 12-1 (steps 1802-2 and 1802-3). As discussed above, the one or more parameters for the air interface of each of the base stations 12-1 through 12-3 are preferably indicative of the quality of the air interface. For example, the one or more parameters may include a congestion level of the air interface, a data rate of the air interface, a number of connections for the air interface, a level of radio frequency interference on the air interface, a level of emissions on the air interface, an amount of hand-off failures, a computation load in the base stations 12-1 through 12-3, or the like.

Next, the base station 12-1 programmatically makes the decision to switch the frequency band of operation of the base stations 12-1 through 12-3 to a new frequency band of operation based on the one or more parameters for the air interfaces of the base stations 12-1 through 12-3 (step 1804). In one embodiment, the decision to switch to the new frequency band of operation is made by the base station 12-1 without collaboration with any other base stations 12. In another embodiment, the decision is made via collaboration with one or more additional base stations 12, such as the base stations 12-2 and 12-3. As an example, each of the base stations 12 could vote to switch its frequency band of operation based on the one or more air interface parameters for its own air interface and the one or more air interface parameters for the air interfaces of the other base stations 12. Then, the base station 12-1, determines a consensus decision of the base station 12-1 and the one or more additional base stations 12 based on the votes. This consensus decision is then adopted by the base station 12-1 as its decision to switch the frequency band of operation of the base station 12-1 to a new frequency band of operation.

Preferably, the base station 12-1 provides information indicative of the decision to switch the frequency band of operation of the base stations 12-1 through 12-3 to the control element 16 (step 1806). In response to the decision, the base station 12-1 sends a command to switch the frequency band of operation of the base stations 12-2 and 12-3 to the new frequency band of operation to the base stations 12-2 and 12-3 (steps 1808-2 and 1808-3). The base stations 12-1 through 12-3 then switch the frequency band of operation to the new frequency band of operation (steps 1810-1 through 1810-3). Optionally, the base stations 12-1 through 12-3 obtain an emissions specification for the new frequency band of operation (steps 1812-1 through 1812-3) and configure the one or more radio units that provide the air interfaces of the base stations 12-1 through 12-3 to conform to the emissions specification for the new frequency band of operation (steps 1814-1 through 1814-3).

FIG. 21 is a block diagram of the control element 16 of FIG. 1 according to one embodiment of the present disclosure. The control element 16 may be the network controller 18 of FIG. 4 or the command center 20 of FIG. 8. As illustrated, the control element 16 includes one or more communication subsystems 24 and a control subsystem 26. The one or more communication subsystems 24 generally include analog and, in some embodiments, digital components for sending and receiving communications to and from the base stations 12, other control elements 16, and in some embodiments the command center 20. The control subsystem 26 is implemented in hardware or a combination of hardware and software. In particular embodiments, the control subsystem 26 may comprise, for example, one or several general-purpose or special-purpose microprocessors or other microcontrollers programmed with suitable software and/or firmware to carry out some or all of the functionality of the control element 16 described herein. In addition or alternatively, the control subsystem 26 may comprise various digital hardware blocks (e.g., one or more Application Specific Integrated Circuits (ASICs), one or more off-the-shelf digital and analog hardware components, or a combination thereof) configured to carry out some or all of the functionality of the control element 16 described herein. Additionally, in particular embodiments, the above described functionality of the control element 16 may be implemented, in whole or in part, by the control subsystem 26 executing software or other instructions stored on a non-transitory computer-readable medium, such as random access memory (RAM), read only memory (ROM), a magnetic storage device, an optical storage device, or any other suitable type of data storage component.

FIG. 22 is a block diagram of one of the base stations 12 of FIG. 1 according to one embodiment of the present disclosure. As illustrated, the base station 12 includes one or more communication subsystems 28, a transceiver subsystem 30 that includes one or more radio units 32, and a control subsystem 34. The one or more communication subsystems 28 generally include analog and, in some embodiments, digital components for sending and receiving communications to and from the control element 16 and in some embodiments, other base stations 12. The transceiver subsystem 30 generally includes analog and, in some embodiments, digital components for wirelessly sending and receiving messages to and from the wireless devices 14 in the cellular communication network 10. Further, the transceiver subsystem 30 includes the one or more radio units 32 that implement radio-frequency (RF) transceivers, or separate RF transmitters and receivers, capable of transmitting messages and/or other suitable information wirelessly to the wireless devices 14. The control subsystem 34 is implemented in hardware or a combination of hardware and software. In particular embodiments, the control subsystem 34 may comprise, for example, one or several general-purpose or special-purpose microprocessors or other microcontrollers programmed with suitable software and/or firmware to carry out some or all of the functionality of the base station 12 described herein. In addition or alternatively, the control subsystem 34 may comprise various digital hardware blocks (e.g., one or more ASICs, one or more off-the-shelf digital and analog hardware components, or a combination thereof) configured to carry out some or all of the functionality of the base station 12 described herein. Additionally, in particular embodiments, the above described functionality of base station 12 may be implemented, in whole or in part, by the control subsystem 34 executing software or other instructions stored on a non-transitory computer-readable medium, such as RAM, ROM, a magnetic storage device, an optical storage device, or any other suitable type of data storage component.

The following acronyms are used throughout this disclosure.

3GPP 3rd Generation Partnership Project
ASIC Application Specific Integrated Circuit
FCC Federal Communications Commission
GSM Global System for Mobile Communications
LTE Long Term Evolution
MHz Megahertz
RAM Random Access Memory
RF Radio Frequency
ROM Read Only Memory
WiMAX Worldwide Interoperability for Microwave Access Those skilled in the art will recognize improvements and modifications to the preferred embodiments of the present disclosure. All such improvements and modifications are considered within the scope of the concepts disclosed herein and the claims that follow.

What is claimed is:

1. A network controller in a cellular communication network comprising:
a communication subsystem; and a control subsystem associated with the communication subsystem configured to:
obtain one or more parameters for an air interface of a radio unit of a base station;
if one or more predefined criteria are satisfied:
provide the one or more parameters for the air interface to a command center in the cellular communication network; and
in response, receive a decision to switch a frequency band of operation of the radio unit of the base station from a first frequency band to a second frequency band from the command center; and
if the one or more predefined criteria are not satisfied, programmatically make the decision to switch the frequency band of operation of the radio unit of the base station from the first frequency band to the second frequency band based on the one or more parameters for the air interface; and
provide a command to the base station to switch the frequency band of operation of the radio unit of the base station from the first frequency band to the second frequency band in response to the decision.

2. The network controller of claim 1 wherein the one or more parameters for the air interface comprise one or more parameters that are indicative of a congestion level for the air interface.

3. The network controller of claim 1 wherein the one or more parameters for the air interface comprise one or more parameters that are indicative of a data rate for the air interface.

4. The control network controller of claim 1 wherein the one or more parameters for the air interface comprise a number of wireless devices served by the air interface.

5. The network controller of claim 1 wherein the one or more parameters for the air interface comprise one or more parameters that are indicative of interference experienced on the air interface.

6. The network controller of claim 1 wherein the one or more parameters for the air interface comprise one or more parameters that are indicative of emissions levels of the radio unit that provides the air interface.

7. The network controller of claim 1 wherein the one or more parameters for the air interface comprise one or more parameters that are indicative of an amount of hand-off failures on the air interface.

8. The network controller of claim 1 wherein the one or more parameters for the air interface comprise one or more parameters that are indicative of a computation load in the base station.

9. The network controller of claim 1 wherein the control subsystem is further configured to provide information indicative of an air interface emissions specification for the second frequency band to the base station.

10. The network controller of claim 1 wherein the control subsystem is further configured to receive one or more parameters for air interfaces of radio units of one or more additional base stations, and obtain a decision to switch a frequency band of operation of the radio units of the one or more additional base stations from the first frequency band to the second frequency band based on the one or more parameters of the air interface of the radio unit of the base station and the one or more parameters for the air interfaces of the radio units of the one or more additional base stations.

11. A non-transitory computer-readable medium embodied in an article of manufacture encoded with instructions for directing a processor of a network controller in a cellular communication network to:
obtain one or more parameters for an air interface of a radio unit of a base station;
if one or more predefined criteria are satisfied:
provide the one or more parameters for the air interface to a command center in the cellular communication network; and
in response, receive a decision to switch a frequency band of operation of the radio unit of the base station from a first frequency band to a second frequency band from the command center;
if the one or more predefined criteria are not satisfied, programmatically make the decision to switch the frequency band of operation of the radio unit of the base station from the first frequency band to the second frequency band based on the one or more parameters for the air interface; and
provide a command to the base station to switch the frequency band of operation of the radio unit of the base station from the first frequency band to the second frequency band in response to the decision.

12. A method of operation of a network controller in a cellular communication network, comprising:
obtaining one or more parameters for an air interface of a radio unit of a base station;
if one or more predefined criteria are satisfied:
providing the one or more parameters for the air interface to a command center in the cellular communication network; and
in response, receiving a decision to switch a frequency band of operation of the radio unit of the base station from a first frequency band to a second frequency band from the command center;
if the one or more predefined criteria are not satisfied, programmatically making the decision to switch the frequency band of operation of the radio unit of the base station from the first frequency band to the second frequency band based on the one or more parameters for the air interface; and
providing a command to the base station to switch the frequency band of operation of the radio unit of the base station from the first frequency band to the second frequency band in response to the decision.

* * * * *

UNITED STATES PATENT AND TRADEMARK OFFICE
CERTIFICATE OF CORRECTION

| | | |
|---|---|---|
| PATENT NO. | : 8,892,102 B2 | Page 1 of 1 |
| APPLICATION NO. | : 13/561348 | |
| DATED | : November 18, 2014 | |
| INVENTOR(S) | : Smiley | |

It is certified that error appears in the above-identified patent and that said Letters Patent is hereby corrected as shown below:

In the claims

In Column 23, Line 31, in Claim 4, delete "control network" and insert -- network --, therefor.

Signed and Sealed this
Twenty-eighth Day of June, 2016

Michelle K. Lee
*Director of the United States Patent and Trademark Office*